US011095390B2

(12) United States Patent
Dupuis et al.

(10) Patent No.: US 11,095,390 B2
(45) Date of Patent: Aug. 17, 2021

(54) POLARIZATION-INSENSITIVE OPTICAL LINK

(71) Applicant: International Business Machines Corporation, Armonk, NY (US)

(72) Inventors: Nicolas Dupuis, New York, NY (US); Benjamin Lee, Ridgefield, CT (US); Daniel M. Kuchta, Patterson, NY (US); Laurent Schares, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/110,185

(22) Filed: Aug. 23, 2018

(65) Prior Publication Data
US 2020/0067626 A1    Feb. 27, 2020

(51) Int. Cl.
*H04J 14/06*    (2006.01)
*H04B 10/25*    (2013.01)
*H04J 14/02*    (2006.01)

(52) U.S. Cl.
CPC .............. *H04J 14/06* (2013.01); *H04B 10/25* (2013.01); *H04J 14/02* (2013.01)

(58) Field of Classification Search
CPC ....................................................... H04J 14/06
See application file for complete search history.

(56) References Cited

U.S. PATENT DOCUMENTS 5,659,560 A    8/1997 Ouchi et al.
5,949,560 A    9/1999 Roberts et al.
(Continued)

FOREIGN PATENT DOCUMENTS

CN    201018509 Y    2/2008
CN    201263156 Y    6/2009
CN    101599804 A    12/2009

OTHER PUBLICATIONS

Sacher, et al., Polarization controller integrated in the silicon photonics platform, Optics Express, Feb. 10, 2014, 10 Pages, vol. 22, No. 9.

(Continued)

*Primary Examiner* — Pranesh K Barua
(74) *Attorney, Agent, or Firm* — Amin, Turocy & Watson, LLP

(57) ABSTRACT

Systems, computer-implemented methods, and computer program products to facilitate rotated polarization detection and adjustment are provided. According to an embodiment, a system can comprise a memory that stores computer executable components and a processor that executes the computer executable components stored in the memory. The computer executable components can comprise an optical component that can comprise a polarization monitor component that can detect a rotated polarization state of an optical signal. The computer executable components can further comprise a second optical component that can comprise a polarization controller component that can control a rotation polarization state of the second optical component. The computer executable components can further comprise a feedback loop component that can couple the polarization monitor component to the polarization controller component.

20 Claims, 16 Drawing Sheets

(56) References Cited

U.S. PATENT DOCUMENTS

| | | | |
|---|---|---|---|
| 7,067,795 B1* | 6/2006 | Yan | G02F 1/0123 250/225 |
| 7,082,229 B2 | 7/2006 | Galtarossa et al. | |
| H2190 H | 6/2007 | Chen | |
| 7,257,290 B2 | 8/2007 | Bulow | |
| 7,403,717 B2* | 7/2008 | von der Weid | G02B 6/274 356/73.1 |
| 7,558,479 B1* | 7/2009 | Robinson | H04B 10/0795 398/13 |
| 8,073,326 B2* | 12/2011 | Yan | H04J 14/06 398/152 |
| 10,663,346 B2* | 5/2020 | Hegyi | G01J 3/45 |
| 2003/0067671 A1* | 4/2003 | Islam | H04B 10/296 359/337 |
| 2003/0175033 A1* | 9/2003 | Taga | H04J 14/06 398/152 |
| 2004/0019459 A1* | 1/2004 | Dietz | G01M 11/33 702/184 |
| 2005/0199787 A1* | 9/2005 | Zhang | G02F 1/0136 250/225 |
| 2005/0254749 A1* | 11/2005 | Bulow | H04B 10/2572 385/27 |
| 2006/0159463 A1* | 7/2006 | Futami | G01J 11/00 398/152 |
| 2006/0210211 A1* | 9/2006 | Taylor | H04J 14/0201 385/1 |
| 2008/0151244 A1* | 6/2008 | Okabe | H04Q 11/0005 356/364 |
| 2009/0028565 A1* | 1/2009 | Yao | H04B 10/0795 398/79 |
| 2010/0098420 A1* | 4/2010 | Ibragimov | H04B 10/0775 398/65 |
| 2010/0239246 A1* | 9/2010 | Taylor | H04B 10/572 398/34 |
| 2011/0249971 A1* | 10/2011 | Oda | H04B 10/2572 398/65 |
| 2012/0002971 A1 | 1/2012 | Doerr | |
| 2012/0063783 A1* | 3/2012 | Vassilieva | H04J 14/0221 398/81 |
| 2013/0004162 A1* | 1/2013 | Osaka | H04J 14/02 398/34 |
| 2013/0083925 A1* | 4/2013 | Nordholt | H04B 10/70 380/256 |
| 2014/0023362 A1* | 1/2014 | Vassilieva | H04B 10/2572 398/26 |
| 2014/0363164 A1* | 12/2014 | Kim | H04B 10/2572 398/65 |
| 2015/0365187 A1* | 12/2015 | Kondo | H04B 10/07955 398/38 |
| 2019/0293872 A1* | 9/2019 | Nebendahl | G02B 6/29338 |

OTHER PUBLICATIONS

Sacher, et al., Multilayer Silicon Nitride-on-Silicon Integrated Photonic Platforms and Devices, Journal of Lightwave Technology, Feb. 15, 2015, pp. 901-910, vol. 33, No. 4.

Moller, WDM Polarization Controller in PLC Technology, IEEE Photonics Technology Letters, Jun. 6, 2001, pp. 585-587, vol. 13, No. 6.

Goodwill, et al., Dual-Core Polarization Diverse Silicon Photonic Add/Drop Switch Supporting 400Gb/s PDM-16QAM, 2017, 3 Pages.

* cited by examiner

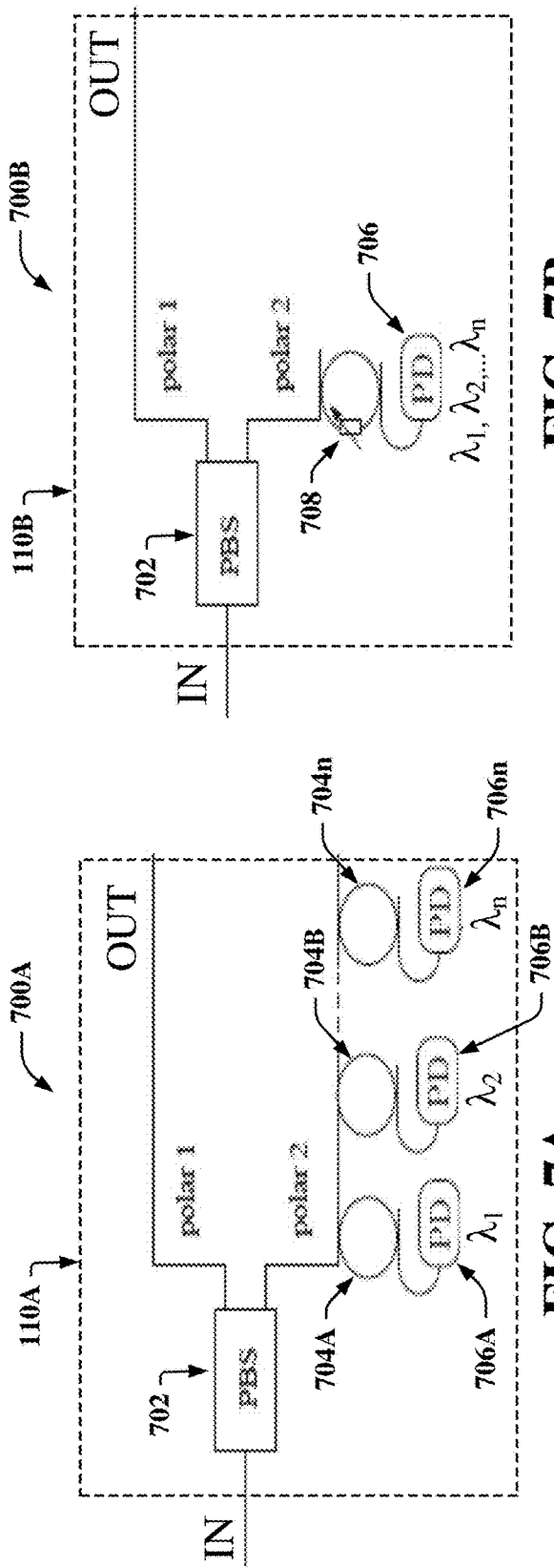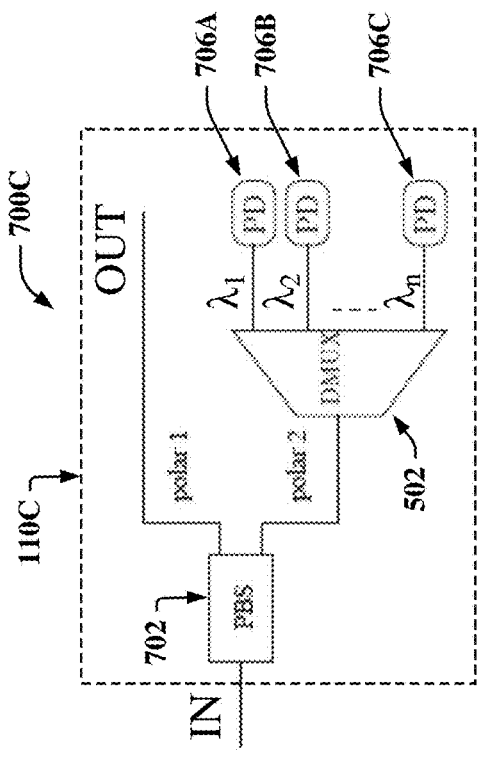
FIG. 7A
FIG. 7B
FIG. 7C

POLARIZATION-INSENSITIVE OPTICAL LINK

BACKGROUND

The subject disclosure relates to optical links, and more specifically, to rotated polarization detection and adjustment components of optical links.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate rotated polarization detection and adjustment are described.

According to an embodiment, a system can comprise a memory that stores computer executable components and a processor that executes the computer executable components stored in the memory. The computer executable components can comprise an optical component that can comprise a polarization monitor component that can detect a rotated polarization state of an optical signal. The computer executable components can further comprise a second optical component that can comprise a polarization controller component that can control a rotation polarization state of the second optical component. The computer executable components can further comprise a feedback loop component that can couple the polarization monitor component to the polarization controller component.

According to another embodiment, a computer-implemented method can comprise detecting, by a system operatively coupled to a processor, a rotated polarization state of an optical signal. The computer-implemented method can further comprise coupling, by the system, a polarization monitor component of an optical component to a polarization controller component of a second optical component based on the detecting the rotated polarization state of the optical signal.

According to yet another embodiment, a computer program product that can facilitate a rotated polarization detection and adjustment process is provided. The computer program product can comprise a computer readable storage medium having program instructions embodied therewith, the program instructions can be executable by a processing component to cause the processing component to detect, by the processor, a rotated polarization state of an optical signal. The program instructions can further cause the processing component to couple, by the processor, a polarization monitor component of an optical component to a polarization controller component of a second optical component based on detecting the rotated polarization state of the optical signal.

DESCRIPTION OF THE DRAWINGS

FIG. 7A illustrates a block diagram of an example, non-limiting system that facilitates rotated polarization detection and adjustment components in accordance with one or more embodiments described herein.

FIG. 7B illustrates a block diagram of an example, non-limiting system that facilitates rotated polarization detection and adjustment components in accordance with one or more embodiments described herein.

FIG. 7C illustrates a block diagram of an example, non-limiting system that facilitates rotated polarization detection and adjustment components in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
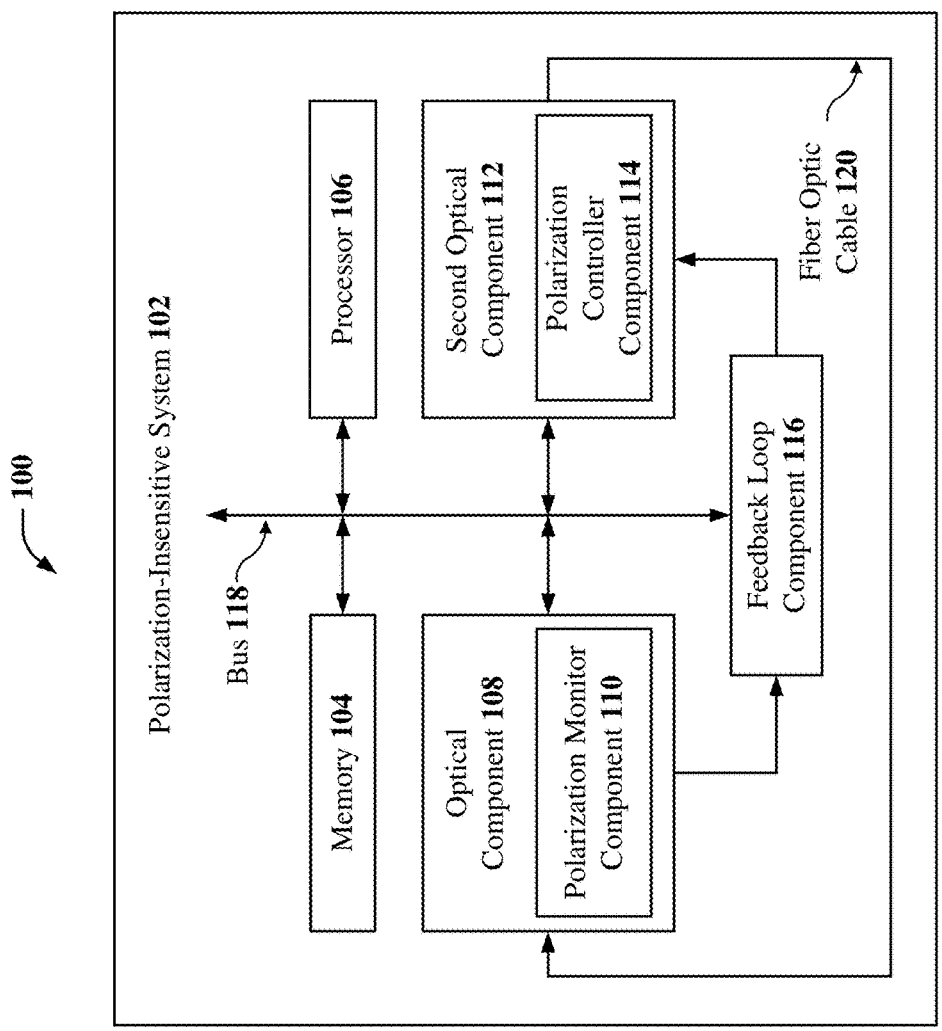
FIG. 1 illustrates a block diagram of an example, non-limiting system that facilitates rotated polarization detection and adjustment components in accordance with one or more embodiments described herein.

FIG. 1 illustrates a block diagram of an example, non-limiting system 100 that facilitates rotated polarization detection and adjustment components in accordance with one or more embodiments described herein. According to several embodiments, system 100 can comprise a polarization-insensitive system 102. In some embodiments, polarization-insensitive system 102 can comprise a memory 104, a processor 106, an optical component 108, a second optical component 112, a feedback loop component 116, and/or a bus 118. In some embodiments, optical component 108 can comprise a polarization monitor component 110. In some embodiments, second optical component 112 can comprise a polarization controller component 114.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or polarization-insensitive system 102 can further comprise various computer and/or computing-based elements described herein with reference to operating environment 1400 and FIG. 14. In several embodiments, such computer and/or computing-based elements can be used in connection with implementing one or more of the systems, devices, components, and/or computer-implemented operations shown and described in connection with FIG. 1 or other figures disclosed herein.

According to several embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to polarization-insensitive system 102, optical component 108, polarization monitor component 110, second optical component 112, polarization controller component 114, and/or feedback loop component 116.

In several embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1416 and FIG. 14. Such examples of memory 104 can be employed to implement any embodiments of the subject disclosure.

According to some embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor.

According to multiple embodiments, polarization-insensitive system 102, memory 104, processor 106, optical component 108, polarization monitor component 110, second optical component 112, polarization controller component 114, and/or feedback loop component 116 can be communicatively, electrically, and/or operatively coupled to one another via a bus 118 to perform functions of system 100, polarization-insensitive system 102, and/or any components coupled therewith. In several embodiments, bus 118 can comprise one or more memory bus, memory controller, peripheral bus, external bus, local bus, and/or another type of bus that can employ various bus architectures. Further examples of bus 118 are described below with reference to system bus 1418 and FIG. 14. Such examples of bus 118 can be employed to implement any embodiments of the subject disclosure.

According to several embodiments, feedback loop component 116 can couple (e.g., communicatively, electronically, operatively, optically, etc.) optical component 108 (and/or polarization monitor component 110) to second optical component 112 (and/or polarization controller component 114). For example, feedback loop component 116 can couple such components via a data cable (e.g., High-Definition Multimedia Interface (HDMI), recommended standard (RS) 232, Ethernet cable, etc.).

In some embodiments, feedback loop component 116 can couple (e.g., communicatively, electronically, operatively, optically, etc.) optical component 108 (and/or polarization monitor component 110) to second optical component 112 (and/or polarization controller component 114) via a network (not illustrated in the embodiment depicted in FIG. 1). For example, such a network can comprise wired and wireless networks, including, but not limited to, a cellular network, a wide area network (WAN) (e.g., the Internet), a local area network (LAN), wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, polarization-insensitive system 102 and/or components associated therewith (e.g., optical component 108, polarization monitor component 110, second optical component 112, polarization controller component 114, feedback loop component 116) can thus comprise hardware (e.g., a central processing unit (CPU), a transceiver, a decoder), software (e.g., a set of threads, a set of processes, software in execution), or a combination of hardware and software that can facilitate communicating information (e.g., an optical signal, an electrical signal, a wireless signal, etc.) between optical component 108 (and/or polarization monitor component 110) and second optical component 112 (and/or polarization controller component 114).

According to multiple embodiments, optical component 108 can be coupled (e.g., optically) to second optical component 112 via an optical fiber, such as, for example, fiber optic (FO) cable 120. In some embodiments, fiber optic (FO) cable 120 can provide a medium to transmit light (i.e., propagate light or guide light). For example, fiber optic cable 120 can facilitate propagation of coherent light linearly polarized and aligned with a horizontal or vertical transmission axis of fiber optic cable 120. In some embodiments, fiber optic cable 120 can comprise various types of optical fibers and/or fiber optic cables including, but not limited to, single-mode FO cable, multi-mode FO cable, plastic optical fiber (POF), step-index multi-mode optical fiber, graded-index multi-mode optical fiber, optical fiber conductive (OFC), optical fiber nonconductive (OFN), optical fiber conductive general use (OFCG), optical fiber nonconductive general use (OFNG), optical fiber conductive plenum (OFCP), optical fiber nonconductive plenum (OFNP), optical fiber conductive riser (OFCR), optical fiber nonconductive riser (OFNR), and/or other optical fibers or fiber optic cables.

According to several embodiments, polarization-insensitive system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with polarization-insensitive system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, optical component 108, polarization monitor component 110, second optical component 112, polarization controller component 114, feedback loop component 116, and/or any other components associated with polarization-insensitive system 102 (e.g., communicatively, electronically, and/or operatively coupled with and/or employed by polarization-insensitive system 102), can comprise such computer and/or machine readable, writable, and/or executable component(s) and/or instruction(s). Consequently, according to numerous embodiments, polarization-insensitive system 102 and/or any components associated therewith, can employ processor 106 to execute such computer and/or machine readable, writable, and/or executable component(s) and/or instruction(s) to facilitate performance of one or more operations described herein with reference to polarization-insensitive system 102 and/or any such components associated therewith.

In some embodiments, polarization-insensitive system 102 can comprise any type of optical link. For example, polarization-insensitive system 102 can comprise a single-mode optical link (e.g., a single-mode optical fiber (SMF)), a point-to-point optical link, an optical link of an optical switch network, an optical link of a wavelength-division multiplexing (WDM) network, and/or another optical link. Further embodiments of polarization-insensitive system 102 are described below with reference to FIG. 2, FIGS. 3A & 3B, FIGS. 4A, 4B, & 4C, FIG. 8, and FIGS. 10A & 10B. Such embodiments of polarization-insensitive system 102 can be employed to implement the subject disclosure.

In some embodiments, polarization-insensitive system 102 can facilitate performance of operations executed by and/or associated with optical component 108, polarization monitor component 110, second optical component 112, polarization controller component 114, and/or feedback loop component 116. For example, as described in detail below, polarization-insensitive system 102 can facilitate: transmitting an optical signal to an optical component that can comprise a polarization monitor component that can detect a rotated polarization state of the optical signal; coupling the polarization monitor component of the optical component to a polarization controller component of a second optical component; transmitting a feedback signal to the polarization controller component, based on the rotated polarization state of the optical signal; adjusting a rotation polarization state of the second optical component, based on the feedback signal; managing the feedback signal; and/or managing adjustment of a rotation polarization state of the second optical component.

According to multiple embodiments, second optical component 112 can generate an optical signal. For example, second optical component 112 can comprise a laser that can generate a beam of light (e.g., coherent light) and a modulator (e.g., an optical modulator) that can modulate the beam of light (e.g., via modulating phase, amplitude, etc.), thereby generating an optical signal. In some embodiments, second optical component 112 can comprise a polarization controller component that can control (e.g., set and/or adjust) a polarization state of an optical signal. For example, second optical component 112 can comprise polarization controller component 114 that can control (e.g., set and/or adjust) a polarization state of an optical signal generated by second optical component 112. For instance, polarization controller component 114 can control (e.g., set and/or adjust) a polarization state of an optical signal generated by second optical component 112, where such polarization state can include, but is not limited to, a horizontal polarization state, a vertical polarization state, and/or another polarization state corresponding to such an optical signal.

In some embodiments, to facilitate setting a polarization state of an optical signal, polarization controller component 114 can comprise a polarization controller. For instance, polarization controller component 114 can comprise a polarization controller that can comprise one or more polarization-rotator-splitters (PRS), one or more tunable couplers, and/or one or more phase controllers, where such components can collectively produce a desired state-of-polarization (SOP), such as, for example, a horizontal polarization or a vertical polarization. For example, polarization controller component 114 can comprise a first polarization-rotator-splitter that can split the polarizations of a light beam and rotate one of such polarizations such that both polarizations can be aligned to the same axis. In this example, such aligned polarizations can be interfered with one or more tunable couplers and phase controllers and recombined using a second polarization-rotator-splitter to produce a desired SOP. Further embodiments of polarization controller component 114 are described below with reference to FIG. 5A, FIG. 5B, and FIG. 6. Such embodiments of polarization controller component 114 can be employed to implement the subject disclosure.

In some embodiments, second optical component 112 can comprise an optical component that can transmit an optical signal. For example, second optical component 112 can comprise an optical transmitter, a wavelength division multiplexer transmitter, an optical switch, an optical repeater, and/or another optical component that can transmit an optical signal. In some embodiments, second optical component 112 can transmit an optical signal to optical component 108. For example, second optical component 112 can comprise an optical transmitter that can transmit an optical signal to optical component 108 via fiber optic cable 120. For instance, second optical component 112 can comprise an optical transmitter that can transmit to optical component 108 (e.g., via fiber optic cable 120) an optical signal generated by second optical component 112 (e.g., an optical signal comprising a polarization state set by polarization controller component 114, as described above). Further embodiments of second optical component 112 are described below with reference to FIG. 6, FIG. 8, and FIGS. 10A & 10B. Such embodiments of second optical component 112 can be employed to implement the subject disclosure.

In some embodiments, a polarization state of an optical signal transmitted via fiber optic cable 120 can randomly rotate. For example, a polarization state of an optical signal (e.g., a polarization state corresponding to a wavelength of an optical signal) can randomly rotate in fiber optic cable 120 from a horizontal polarization state to a vertical polarization state or vice versa, or from a horizontal polarization state (or a vertical polarization state) to any angle between a horizontal polarization state and a vertical polarization state (e.g., a 45-degree angle (45° angle)). For instance, an optical signal generated by second optical component 112 (e.g., via a laser and modulator, as described above) can comprise a horizontal polarization state set by polarization controller component 114 (e.g., as described above). In this example, the horizontal polarization state of such an optical signal can randomly rotate to a vertical polarization state as a result of propagating through fiber optic cable 120. In some embodiments, a polarization state corresponding respectively to multiple wavelengths can randomly rotate in fiber optic cable 120. For example, a polarization state corresponding to a certain wavelength $\lambda_1$ of an optical signal can rotate while a polarization state corresponding to another wavelength $\lambda_2$ of the optical signal can remain unchanged (i.e., no rotation) in fiber optic cable 120.

According to multiple embodiments, optical component 108 can comprise an optical component that can receive an optical signal. For example, optical component 108 can comprise an optical component that can receive an optical signal generated, modulated, and/or transmitted by second optical component 112 (e.g., as described above). For instance, optical component 108 can comprise an optical receiver, a wavelength division multiplexer optical receiver, an optical switch, an optical repeater, and/or another optical component that can take as an input any optical signal. Further embodiments of optical component 108 are described below with reference to FIG. 8 and FIGS. 10A & 10B. Such embodiments of optical component 108 can be employed to implement the subject disclosure.

In some embodiments, optical component 108 can comprise a polarization monitor component that can detect a rotated polarization state of an optical signal. For example, optical component 108 can comprise polarization monitor component 110 that can continuously monitor an incoming optical signal (e.g., polarization of an incoming optical signal) and detect a rotated polarization state of such incoming optical signal (e.g., an optical signal propagating through fiber optic cable 120). For instance, polarization monitor component 110 can detect a rotated polarization state of an optical signal comprising a polarization state (e.g., horizontal polarization, vertical polarization, etc.) set by second optical component 112. In this example, polarization monitor component 110 can detect a horizontal polarization state that has rotated to a vertical polarization state (or vice versa) as a result of propagating such an optical signal through fiber optic cable 120 (e.g., as described above).

In some embodiments, to facilitate detecting a rotated polarization state of an optical signal, polarization monitor component 110 can comprise one or more broadband polarization beam splitters (PBS) that can separate (split) polarizations to detect wanted and unwanted polarization states corresponding to a wavelength of an optical signal. For example, polarization monitor component 110 can comprise a broadband polarization beam splitter (PBS) and can detect the polarization state upon which the PBS depends. For instance, such a polarization monitor can be dependent on a horizontal polarization state (e.g., a transverse electric polarization state). In this example, as the polarization monitor can be dependent on such a horizontal polarization state, the polarization monitor can detect such polarization (e.g., wanted transverse electric polarization), as well as polarization states that are different from the horizontal polarization state, such as, for example a vertical polarization state (e.g., unwanted transverse magnetic polarization). Continuing with this example, the PBS can separate (split) the horizontal and vertical polarizations to allow the horizontal polarization (e.g., wanted transverse electric polarization) to pass to downstream components of optical component 108, while directing the vertical polarization (i.e., unwanted transverse magnetic polarization) to pass to other components of polarization monitor component 110 (e.g., ring filter, tunable ring filter, photodetector, etc.) to determine an extent to which a polarization state of a wavelength has been rotated (e.g., by fiber optic cable 120).

In some embodiments, to determine an extent to which a polarization state of a wavelength has been rotated (e.g., by fiber optic cable 120), polarization monitor component 110 can comprise one or more photodetectors that can convert optical energy (e.g., light photons) of an optical signal to an electrical current, such as, for example, photo current $I_{pd}$. In such embodiments, the photo current $I_{pd}$ can be indicative of a degree of a rotated polarization state of a wavelength. For example, a photo current $I_{pd}$ value that is equal to or greater than a predetermined threshold value can be indicative of a rotated polarization state of a wavelength, and a photo current $I_{pd}$ value that is less than such a predetermined threshold value can be indicative of substantially no rotated polarization state of a wavelength. In some embodiments, a photo current $I_{pd}$ value of zero (0) corresponding to a certain wavelength can be indicative of a correct polarization for such wavelength. Further embodiments of polarization monitor component 110 are described below with reference to FIGS. 7A, 7B, & 7C. Such embodiments of polarization monitor component 110 can be employed to implement the subject disclosure.

According to multiple embodiments, based on detecting a rotated polarization state of an optical signal and/or determining an extent of such rotation (e.g., as described above), polarization monitor component 110 can transmit one or more feedback signals to second optical component 112 and/or polarization controller component 114. For example, based on detecting a rotated polarization state of an optical signal generated and transmitted by second optical component 112, polarization monitor component 110 can transmit one or more feedback signals to polarization controller component 114 via feedback loop component 116. In some embodiments, polarization monitor component 110 can transmit a feedback signal including, but not limited to, an optical feedback signal, an electrical feedback signal, a wireless feedback signal, and/or another feedback signal. In some embodiments, polarization monitor component 110 can transmit a feedback signal comprising a photo current $I_{pd}$ value corresponding to a certain wavelength (i.e., channel) of an optical signal, where such photo current $I_{pd}$ value can be indicative of a degree of a rotated polarization state of such wavelength.

In some embodiments, based on the feedback signal transmitted by polarization monitor component 110 (e.g., as described above), polarization controller component 114 can adjust a rotation polarization state of second optical component 112. For example, polarization controller component 114 can adjust a rotation polarization state of one or more wavelengths of an optical signal generated, modulated, and transmitted by second optical component 112. In several embodiments, polarization controller component 114 can employ a polarization controller to facilitate adjusting (tuning) a SOP of respective wavelengths of an optical signal. For example, to facilitate such adjusting in a point-to-point optical link system, polarization controller component 114 can employ a polarization controller comprising polarization-rotator-splitters (PRS), tunable couplers, and/or phase controllers, as described above. In another example, to facilitate such adjusting in a WDM optical network, polarization controller component 114 can employ a WDM polarization controller, as described above.

In some embodiments, to facilitate adjusting a rotation polarization state of one or more wavelengths of an optical signal, polarization controller component 114 can employ one or more look-up tables comprising one or more SOP values that can correspond respectively with one or more photo current $I_{pd}$ values. For example, polarization controller component 114 can be calibrated (e.g., via an integrated reference optical signal transmitter) and one or more look-up tables can be generated based on such calibration, where such look-up tables can be employed to determine a SOP value as a function of the polarization controller settings $[I_H]$, wavelength $\lambda$, and time T, such as, for instance SOP=f($[I_H]$, $\lambda$, T). In this example, polarization monitor component 110 can be calibrated (e.g., via an integrated reference optical signal transmitter) and one or more look-up tables can be generated based on such calibration, where such look-up tables can be employed to determine a photo current $I_{pd}$ value as a function of the SOP, wavelength $\lambda$, and time T, such as, for instance $I_{pd}$=g(SOP, $\lambda$, T). In some embodiments, such look-up tables can be stored on a non-volatile memory (e.g., memory 104).

In some embodiments, based on receiving a feedback signal comprising a photo current $I_{pd}$ value corresponding to a wavelength having a rotated SOP (e.g., as determined by polarization monitor component 110), polarization controller component 114 can reference one or more look-up tables (e.g., look-up tables generated during calibration, as described above) to determine an adjustment of the wavelength SOP required to cancel out a fiber rotation matrix of fiber optic cable 120 (e.g., an adjustment required to correct a wavelength polarization that rotated in fiber optic cable 120). For instance, polarization controller component 114 can reference such one or more look-up tables to determine settings of the polarization controller (e.g., settings of the polarization-rotator-splitters (PRS), tunable couplers, and/or phase controllers described above), or settings of the WDM polarization controller, required to adjust the wavelength SOP to a correct polarization (e.g., a horizontal polarization, a vertical polarization, etc.). In such an example, polarization controller component 114 can employ such look-up tables to adjust a rotated SOP of a wavelength of an optical signal (e.g., to adjust an unwanted vertical polarization state to a wanted horizontal polarization state).

In some embodiments, as described above, polarization monitor component 110 can detect a rotated polarization state corresponding to a wavelength of an optical signal and can further transmit a feedback signal indicative of the extent of such rotation to polarization controller component 114 (e.g., via feedback loop component 116). In such embodiments, as described above, polarization controller component 114 can adjust (tune) a SOP of such wavelength. In some embodiments, such a cycle (e.g., detecting a rotated polarization state, transmitting a feedback signal, and adjusting a SOP) can repeat continuously to minimize the photo current $I_{pd}$ value corresponding respectively to one or more wavelengths of an optical signal. In some embodiments, such a cycle can continue until polarization monitor component 110 does not detect an unwanted (rotated) polarization corresponding to any wavelength of an optical signal. For example, such a cycle can continue until the photo current $I_{pd}$ value corresponding respectively to one or more wavelengths of an optical signal is equal to zero (0), which can be indicative of a correct polarization state of such wavelengths. In another example, such a cycle can continue until the photo current $I_{pd}$ value corresponding respectively to one or more wavelengths of an optical signal is substantially equal to zero (0), for instance, to account for noise in the optical signal. In this example, continuing such a cycle until such photo current $I_{pd}$ values are substantially equal to zero (0) can be indicative of a substantially correct polarization state of such wavelengths (e.g., indicative of substantially no rotation of a polarization state of such wavelengths).

According to multiple embodiments, polarization-insensitive system 102 and/or components associated therewith (e.g., memory 104, processor 106, optical component 108, polarization monitor component 110, second optical component 112, polarization controller component 114, feedback loop component 116, bus 118, fiber optic cable 120, etc.) can be monolithically integrated in one or more planar technologies. For example, polarization-insensitive system 102 and/or components associated therewith can be integrated (e.g., with other optical components) in one or more planar technologies including, but not limited to, silicon photonic technologies, III-V compound semiconductor technologies, silica-on-silicon technologies, and/or another planar technology.

In some embodiments, polarization-insensitive system 102 and/or components associated therewith can be fabricated in a semiconductor device utilizing one or more techniques for fabricating an integrated circuit. For instance, polarization-insensitive system 102, and/or other embodiments described herein, can be fabricated by employing techniques including, but not limited to: photolithography, microlithography, nanolithography, nanoimprint lithography, photomasking techniques, patterning techniques, photoresist techniques, etching techniques (e.g., reactive ion etching (RIE), dry etching, wet etching, etc.), sputtering techniques, plasma etching techniques, thermal treatments (e.g., rapid thermal anneal, furnace anneals, thermal oxidation, etc.), chemical vapor deposition (CVD), physical vapor deposition (PVD), molecular beam epitaxy (MBE), electrochemical deposition (ECD), chemical-mechanical planarization (CMP), backgrinding techniques, and/or another technique for fabricating an integrated circuit.

In some embodiments, polarization-insensitive system 102 and/or components associated therewith can be fabricated (e.g., as described above) using various materials. For example, polarization-insensitive system 102, and/or other embodiments described herein, can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

Figure 2:
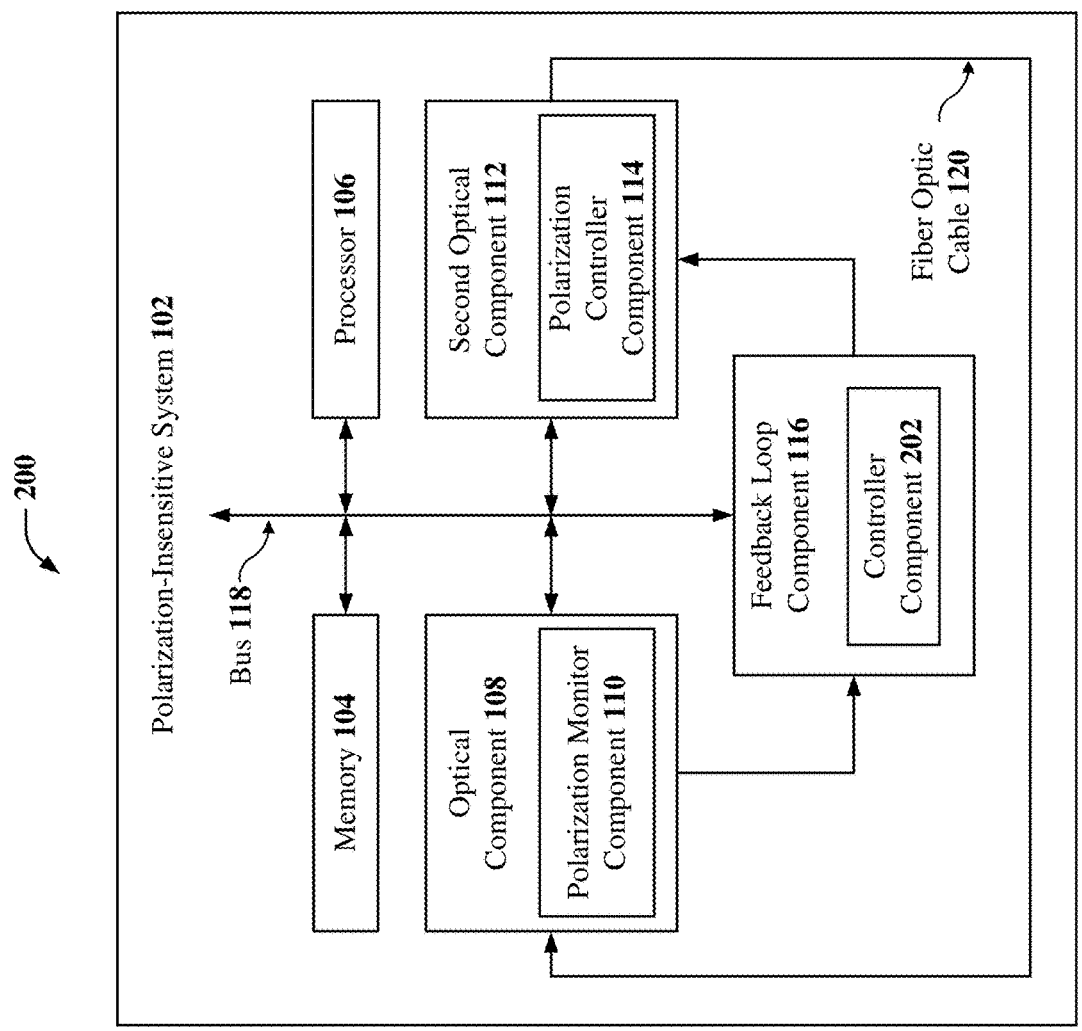
FIG. 2 illustrates a block diagram of an example, non-limiting system that facilitates rotated polarization detection and adjustment components in accordance with one or more embodiments described herein.

FIG. 2 illustrates a block diagram of an example, non-limiting system 200 that facilitates rotated polarization detection and adjustment components in accordance with one or more embodiments described herein. Repetitive description of like elements employed in respective embodiments is omitted for sake of brevity. According to several embodiments, system 200 can comprise polarization-insensitive system 102. In some embodiments, polarization-insensitive system 102 can comprise feedback loop component 116, which can comprise controller component 202.

According to multiple embodiments, controller component 202 can manage one or more feedback signals. For example, controller component 202 can manage one or more feedback signals transmitted by polarization monitor component 110 to polarization controller component 114 via feedback loop component 116 (e.g., as described above with reference to FIG. 1). In some embodiments, controller component 202 can manage various operations associated with one or more feedback signals. For example, controller component 202 manage operations including, but not limited to, encoding such feedback signals, modulating such feedback signals, routing such feedback signals to polarization controller component 114, and/or another operation.

In some embodiments, controller component 202 can manage adjustment of a rotation polarization state of an optical component. For example, controller component 202 can manage adjustment of a rotation polarization state of second optical component 112. For instance, controller component 202 can manage adjustment of a rotation polarization state of a wavelength of an optical signal generated, modulated, and/or transmitted by second optical component 112.

In some embodiments, controller component 202 can determine which wavelength of an optical signal has a rotated SOP that requires adjustment and facilitate adjustment of such wavelength polarization by polarization controller component 114. For example, controller component 202 can analyze feedback signals corresponding to wavelengths $\lambda_1, \lambda_2, \lambda_n$ and determine that only wavelength $\lambda_1$ requires a polarization adjustment (e.g., based on a photo current $I_{pd}$ value corresponding to wavelength $\lambda_1$, as determined by polarization monitor component 110). For instance, controller component 202 can reference one or more look-up tables (e.g., look-up tables described above with reference to FIG. 1) to determine which wavelengths $\lambda_1, \lambda_2, \lambda_n$ require a polarization adjustment.

In some embodiments, based on receiving a feedback signal comprising a photo current $I_{pd}$ value corresponding to a wavelength having a rotated SOP (e.g., as determined by polarization monitor component 110), controller component 202 can reference one or more look-up tables (e.g., look-up tables described above with reference to FIG. 1) to determine an adjustment of the wavelength SOP required to cancel out a fiber rotation matrix of fiber optic cable 120 (e.g., an adjustment required to correct a wavelength polarization that rotated in fiber optic cable 120). For instance, controller component 202 can reference such one or more look-up tables to determine settings of polarization controller component 114 that can be implemented to adjust the wavelength SOP to a correct polarization (e.g., a horizontal polarization, a vertical polarization, etc.). In such an example, controller component 202 can communicate (e.g., via feedback loop component 116) such settings to polarization controller component 114 and polarization controller component 114 can implement such settings to adjust a rotated SOP of a wavelength of an optical signal (e.g., to adjust an unwanted vertical polarization state to a wanted horizontal polarization state).

In some embodiments, controller component 202 can query one or more components of polarization-insensitive system 102 requesting information corresponding to such respective components. For example, controller component 202 can query optical component 108, polarization monitor component 110, second optical component 112, polarization controller component 114, and/or another component of polarization-insensitive system 102. For instance, controller component 202 can query one or more of such components to request information including, but not limited to, SOP information, power level information, and/or other information corresponding to such respective components.

In some embodiments, controller component 202 can comprise a micro-controller. For example, controller component 202 can comprise micro-controller 202A described below with reference to FIG. 9.

In some embodiments, polarization-insensitive system 102 can be a rotated polarization detection and adjustment system and/or process associated with various technologies. For example, polarization-insensitive system 102 can be associated with optical technologies, fiber optic technologies, optical link technologies, optical telecommunication technologies, OCS technologies, WDM optical link technologies, datacenter technologies, HPC technologies, cloud computing technologies, and/or other technologies.

In some embodiments, polarization-insensitive system 102 can provide technical improvements to systems, devices, components, operational steps, and/or processing steps associated with the various technologies identified above. For example, polarization-insensitive system 102 can detect and adjust a rotated SOP corresponding to one or more wavelengths of an optical signal transmitted in an optical link comprising polarization-dependent and polarization-independent components, which enables transmission of optical signals having multiple wavelengths with different states-of-polarization (e.g., transverse electric and transverse magnetic), thereby eliminating the need for employing multiple, separate optical links to respectively transmit optical signals having wavelengths with a single SOP (e.g., transverse electric or transverse magnetic). For instance, the control-based approach of polarization-insensitive system 102 eliminates the need of employing only polarization independent devices (which limits performance of an optical link due to insertion loss and crosstalk) or a polarization diversity scheme (which requires one polarization rotator-splitter (PRS) per optical link, and therefore, one circuit per polarization, thereby increasing footprint and power consumption of the optical link). In such an example, polarization-insensitive system 102 can enable a reduced footprint, reduced complexity, reduced power consumption, and improved performance associated with such optical links by eliminating the need for multiple, separate PRS components that split and rotate polarizations to facilitate receipt of such polarizations by downstream polarization-dependent components.

In some embodiments, polarization-insensitive system 102 can provide technical improvements to a processing unit associated with an optical link (e.g., a single-mode optical link, a point-to-point optical link, an optical link of a WDM optical network, an optical link of an OCS network, etc.). For example, as polarization-insensitive system 102 can eliminate the need for using multiple, separate polarization rotator-splitter (PRS) components in an optical link (as described above), such elimination of components facilitates reduced workload of a processing unit associated with such optical link (e.g., processor 106, controller component 202, and/or micro-controller 202A). For instance, fewer components in an optical link results in fewer read, write, and/or execute commands for such a processing unit to perform, thereby reducing a workload of such a processing unit, which improves the processing efficiency, processing time, and power efficiency associated with such processing unit (e.g., processor 106, controller component 202, and/or micro-controller 202A).

In some embodiments, polarization-insensitive system 102 can employ hardware and/or software to solve problems that are highly technical in nature, that are not abstract and that cannot be performed as a set of mental acts by a human. For example, polarization-insensitive system 102 can automatically and continuously detect and adjust a rotated SOP corresponding to each wavelength of an optical signal.

It is to be appreciated that polarization-insensitive system 102 can perform a rotated polarization detection and adjustment process utilizing various combinations of electrical components, mechanical components, and circuitry that cannot be replicated in the mind of a human or performed by a human. For example, automatically and continuously detecting and adjusting a rotated SOP corresponding to each wavelength of an optical signal are operations that are greater than the capability of a human mind. For instance, the amount of data processed, the speed of processing such data, and/or the types of data processed by polarization-insensitive system 102 over a certain period of time can be greater, faster, and/or different than the amount, speed, and/or data type that can be processed by a human mind over the same period of time.

According to several embodiments, polarization-insensitive system 102 can also be fully operational towards performing one or more other functions (e.g., fully powered on, fully executed, etc.) while also performing the above-referenced rotated polarization detection and adjustment process. It should be appreciated that such simultaneous multi-operational execution is beyond the capability of a human mind. It should also be appreciated that polarization-insensitive system 102 can include information that is impossible to obtain manually by an entity, such as a human user. For example, the type, amount, and/or variety of information included in optical component 108, polarization monitor component 110, second optical component 112, polarization controller component 114, feedback loop component 116, fiber optic cable 120, and/or controller component 202 can be more complex than information obtained manually by a human user.

Figure 3A:
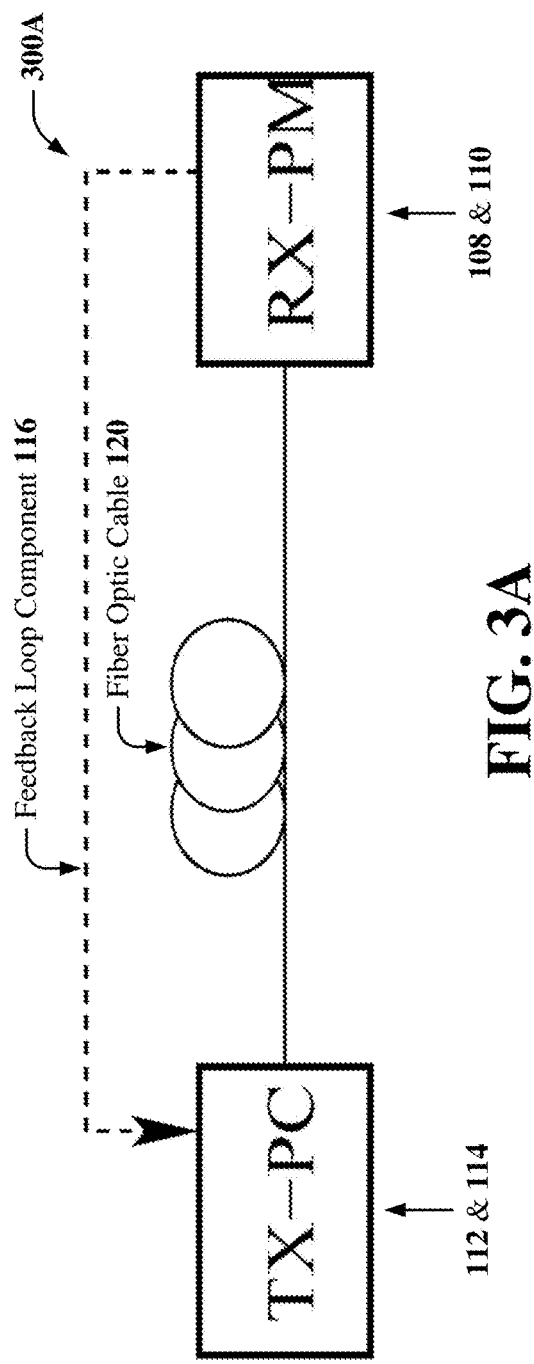
FIG. 3A illustrates a block diagram of an example, non-limiting system that facilitates rotated polarization detection and adjustment components in accordance with one or more embodiments described herein.

FIG. 3A illustrates a block diagram of an example, non-limiting system 300A that facilitates rotated polarization detection and adjustment components in accordance with one or more embodiments described herein. Repetitive description of like elements employed in respective embodiments is omitted for sake of brevity.

According to multiple embodiments, system 300A can comprise polarization-insensitive system 102 implemented in a point-to-point optical link network (e.g., a single channel or single wavelength optical link network). For purposes of clarity and brevity, one or more components of polarization-insensitive system 102 are not illustrated in the embodiment depicted in FIG. 3A (e.g., memory 104, processor 106, bus 118, and controller component 202).

In some embodiments, system 300A can comprise optical component 108, which can comprise polarization monitor component 110. For example, optical component 108 can comprise an optical receiver and such optical receiver can comprise polarization monitor component 110, which can comprise a polarization monitor. In the embodiment depicted in FIG. 3A, such an optical receiver comprising a polarization monitor is designated "RX-PM," where "RX" represents an optical receiver and "PM" represents a polarization monitor. In some embodiments, system 300A can comprise second optical component 112, which can comprise polarization controller component 114. For example, second optical component 112 can comprise an optical transmitter and such optical transmitter can comprise polarization controller component 114, which can comprise a polarization controller. In the embodiment depicted in FIG. 3A, such an optical transmitter comprising a polarization controller is designated "TX-PC," where "TX" represents an optical transmitter and "PC" represents a polarization controller. In some embodiments, system 300A can further comprise feedback loop component 116 and/or fiber optic cable 120.

Figure 3B:
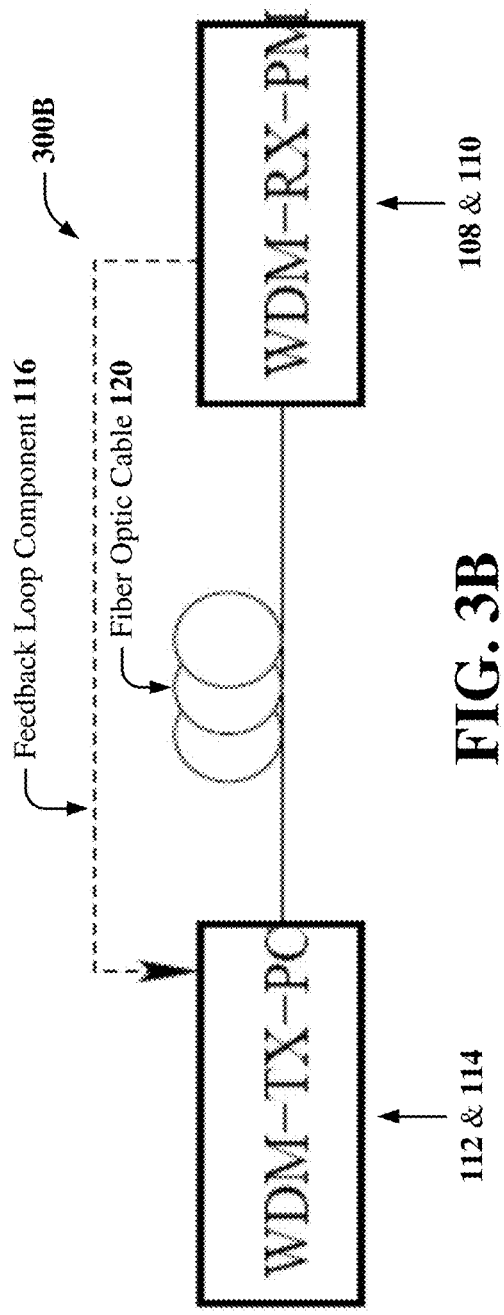
FIG. 3B illustrates a block diagram of an example, non-limiting system that facilitates rotated polarization detection and adjustment components in accordance with one or more embodiments described herein.

FIG. 3B illustrates a block diagram of an example, non-limiting system 300B that facilitates rotated polarization detection and adjustment components in accordance with one or more embodiments described herein. Repetitive description of like elements employed in respective embodiments is omitted for sake of brevity.

According to multiple embodiments, system 300B can comprise polarization-insensitive system 102 implemented as an optical link of a wavelength-division multiplexing (WDM) network (e.g., a multi-channel or multi-wavelength optical link network). For purposes of clarity and brevity, one or more components of polarization-insensitive system 102 are not illustrated in the embodiment depicted in FIG. 3B (e.g., memory 104, processor 106, bus 118, and controller component 202).

In some embodiments, system 300B can comprise optical component 108, which can comprise polarization monitor component 110. For example, optical component 108 can comprise a wavelength-division multiplexer (WDM) receiver and such WDM optical receiver can comprise polarization monitor component 110, which can comprise a WDM polarization monitor. In the embodiment depicted in FIG. 3B, such a WDM optical receiver comprising a WDM polarization monitor is designated "WDM-RX-PM". In some embodiments, system 300B can comprise second optical component 112, which can comprise polarization controller component 114. For example, second optical component 112 can comprise a wavelength-division multiplexer (WDM) optical transmitter and such WDM optical transmitter can comprise polarization controller component 114, which can comprise a WDM polarization controller. In the embodiment depicted in FIG. 3B, such a WDM optical transmitter comprising a WDM polarization controller is designated "WDM-TX-PC".

In some embodiments, system 300B can further comprise feedback loop component 116 and/or fiber optic cable 120. In some embodiments, feedback loop component 116 can comprise multiple feedback loops (not illustrated in the embodiment depicted in FIG. 3B), where each loop can correspond to a single wavelength (i.e., channel) of an optical signal transmitted via fiber optic cable 120. For example, feedback loop component 116 can comprise feedback loop $FL_1$ to feedback loop $FL_n$, where "$FL_n$" represents a total quantity of feedback loops of feedback loop component 116. In such an example, polarization monitor component 110 (e.g., WDM polarization monitor (PM)) can transmit a feedback signal corresponding to a wavelength $\lambda_1$ of an optical signal by employing feedback loop $FL_1$, and/or transmit a feedback signal corresponding to wavelength $\lambda_n$ of an optical signal by employing feedback loop $FL_n$.

Figure 4A:
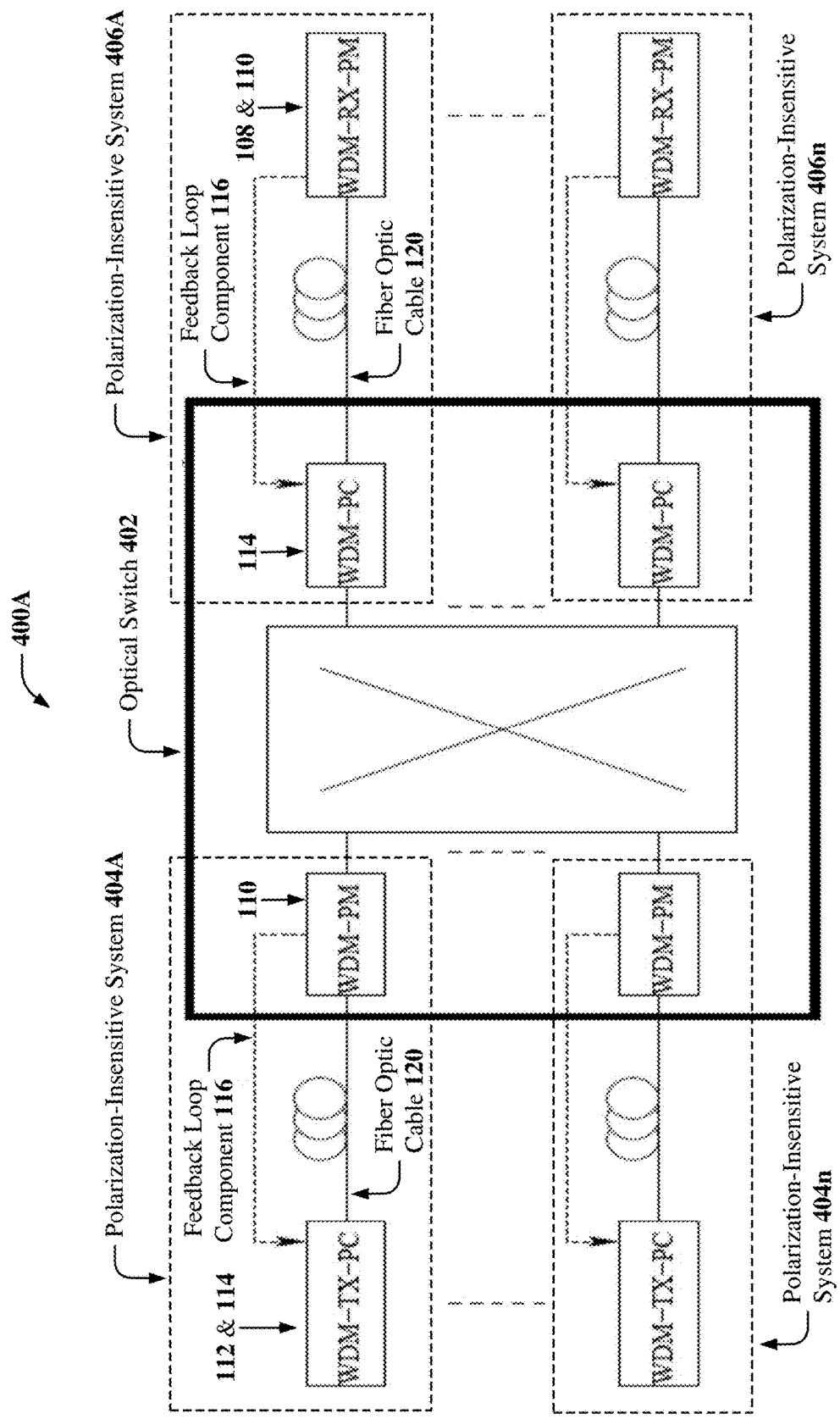
FIG. 4A illustrates a block diagram of an example, non-limiting system that facilitates rotated polarization detection and adjustment components in accordance with one or more embodiments described herein.

FIG. 4A illustrates a block diagram of an example, non-limiting system 400A that facilitates rotated polarization detection and adjustment components in accordance with one or more embodiments described herein. Repetitive description of like elements employed in respective embodiments is omitted for sake of brevity. According to multiple embodiments, system 400A can comprise an optical switch 402, one or more polarization-insensitive systems 404A, 404n, and/or one or more polarization-insensitive systems 406A, 406n, where "n" represents a total quantity of such respective polarization-insensitive systems.

Although FIG. 4A depicts two (2) polarization-insensitive systems 404A, 404n and two (2) polarization-insensitive systems 406A, 406n, it should be appreciated that the embodiment shown in FIG. 4A is for illustration only, and as such, system 400A is not so limited. Further, although FIG. 4A depicts two (2) polarization-insensitive systems 404A, 404n and two (2) polarization-insensitive systems 406A, 406n, for purposes of clarity, only polarization-insensitive system 404A, polarization-insensitive system 406A, and associated components are labeled in the embodiment shown in FIG. 4A. Nonetheless, it should be appreciated that, in some embodiments, polarization-insensitive system 404n and polarization-insensitive system 406n can comprise the same components and functionality as polarization-insensitive system 404A and polarization-insensitive system 406A, respectively.

In some embodiments, optical switch 402 can integrate multiple polarization-insensitive systems 404A, 404n and polarization-insensitive systems 406A, 406n, where such polarization-insensitive systems can comprise alternative embodiments of polarization-insensitive system 102 implemented as optical links of an optical switch network. For example, polarization-insensitive systems 404A, 404n and polarization-insensitive systems 406A, 406n can comprise alternative embodiments of polarization-insensitive system 102 implemented as optical links of a wavelength-division multiplexing (WDM) optical switch network (e.g., a multi-channel or multi-wavelength optical switch network), where such optical links are coupled (e.g., communicatively, electrically, operatively, optically, etc.) to one another via an optical switch fabric (e.g., optical switch 402). For purposes of clarity and brevity, one or more components of polarization-insensitive system 102 are not illustrated in the embodiment depicted in FIG. 4A (e.g., memory 104, processor 106, bus 118, and controller component 202).

In some embodiments, polarization-insensitive system 404A can comprise second optical component 112, which can comprise polarization controller component 114. For example, polarization-insensitive system 404A can comprise a WDM optical transmitter, which can comprise a WDM polarization controller (e.g., the WDM-TX-PC component described above with reference to FIG. 3B). In some embodiments, polarization-insensitive system 404A can further comprise polarization monitor component 110, which can comprise a WDM polarization monitor (designated "WDM-PM" in the embodiment depicted in FIG. 4A). In such embodiments, polarization monitor component 110 (e.g., WDM-PM) can be integrated into optical switch 402 (e.g., by utilizing one or more techniques for fabricating an integrated circuit as described above with reference to FIG. 1).

In some embodiments, polarization-insensitive system 406A can comprise polarization controller component 114, which can comprise a WDM polarization controller (designated "WDM-PC" in the embodiment depicted in FIG. 4A). In such embodiments, polarization controller component 114 (e.g., WDM-PC) can be integrated into optical switch 402 (e.g., by utilizing one or more techniques for fabricating an integrated circuit as described above with reference to FIG. 1). In some embodiments, polarization-insensitive system 406A can further comprise optical component 108, which can comprise polarization monitor component 110. For example, polarization-insensitive system 406A can comprise a WDM optical receiver, which can comprise a WDM polarization monitor (e.g., the WDM-RX-PM component described above with reference to FIG. 3B). In some embodiments, optical component 108 and/or polarization monitor component 110 (e.g., WDM-RX-PM) can comprise polarization-dependent components.

In some embodiments, polarization-insensitive system 404A and polarization-insensitive system 406A can further comprise feedback loop component 116 and/or fiber optic cable 120. In some embodiments, feedback loop component 116 can comprise multiple feedback loops (not illustrated in the embodiment depicted in FIG. 4A), where each loop can correspond to a single wavelength (i.e., channel) of an optical signal transmitted via fiber optic cable 120 (e.g., as described above with reference to FIG. 3B). In some embodiments, polarization-insensitive system 404A can facilitate transmission of feedback signals (e.g., via feedback loop component 116) transmitted by polarization monitor component 110 (e.g., WDM-PM) to second optical component 112 and/or polarization controller component 114 (e.g., WDM-TX-PC). In some embodiments, polarization-insensitive system 406A can facilitate transmission of feedback signals (e.g., via feedback loop component 116) transmitted by optical component 108 and/or polarization monitor component 110 (e.g., WDM-RX-PM) to polarization controller component 114 (e.g., WDM-PC).

Figure 4B:
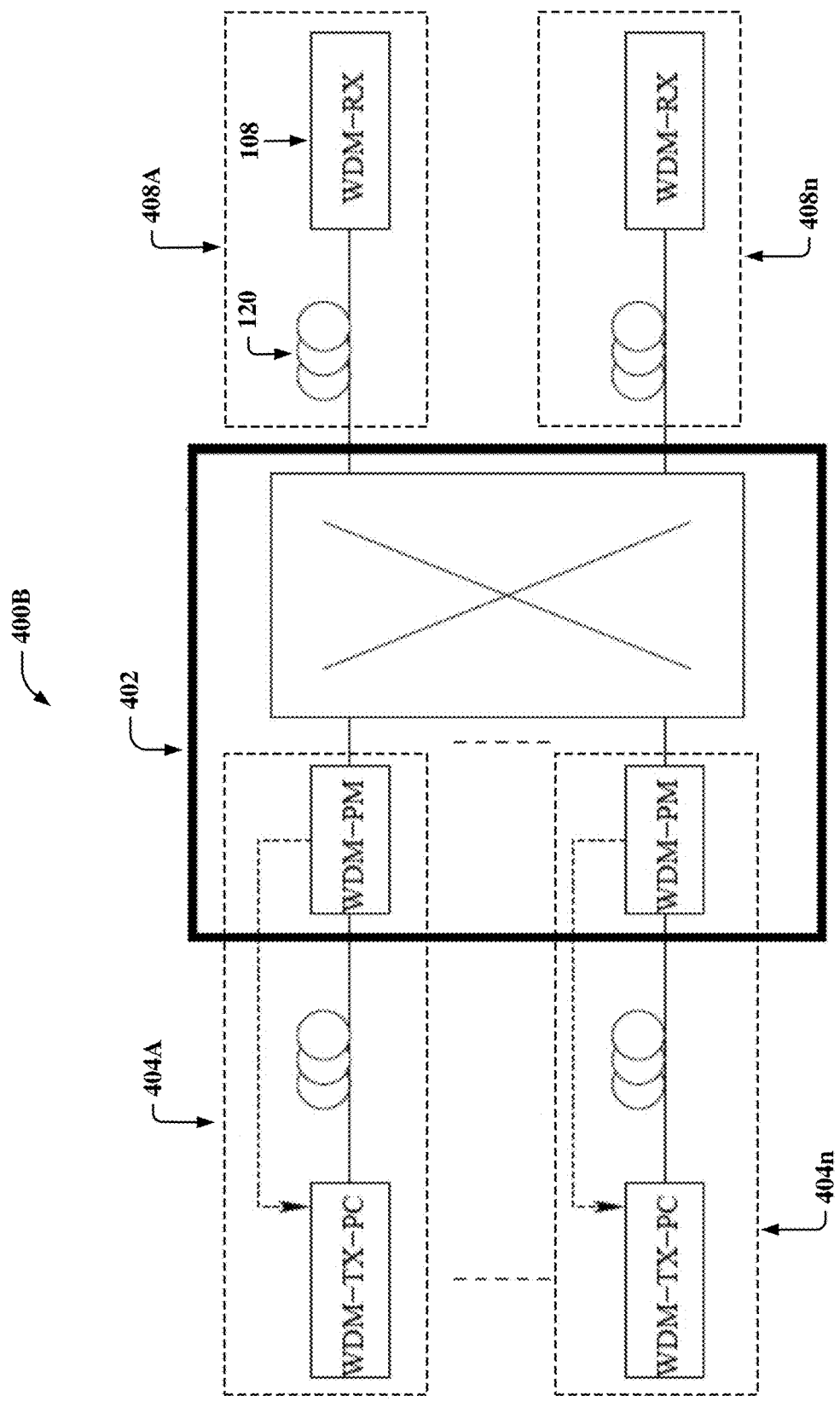
FIG. 4B illustrates a block diagram of an example, non-limiting system that facilitates rotated polarization detection and adjustment components in accordance with one or more embodiments described herein.

FIG. 4B illustrates a block diagram of an example, non-limiting system 400B that facilitates rotated polarization detection and adjustment components in accordance with one or more embodiments described herein. Repetitive description of like elements employed in respective embodiments is omitted for sake of brevity. According to multiple embodiments, system 400B can comprise one or more polarization-insensitive systems 408A, 408n, where "n" represents a total quantity of such polarization-insensitive systems.

Although FIG. 4B depicts two (2) polarization-insensitive systems 408A, 408n, it should be appreciated that the embodiment shown in FIG. 4B is for illustration only, and as such, system 400B is not so limited. Further, although FIG. 4B depicts two (2) polarization-insensitive systems 408A, 408n, for purposes of clarity, only polarization-insensitive system 408A and associated components are labeled in the embodiment shown in FIG. 4B. Nonetheless, it should be appreciated that, in some embodiments, polarization-insensitive system 408n can comprise the same components and functionality as polarization-insensitive system 408A.

In some embodiments, optical switch 402 can integrate multiple polarization-insensitive systems 404A, 404n and polarization-insensitive systems 408A, 408n, where such polarization-insensitive systems can comprise alternative embodiments of polarization-insensitive system 102 implemented as optical links of an optical switch network. For example, polarization-insensitive systems 404A, 404n and polarization-insensitive systems 408A, 408n can comprise alternative embodiments of polarization-insensitive system 102 implemented as optical links of a wavelength-division multiplexing (WDM) optical switch network (e.g., a multi-channel or multi-wavelength optical switch network), where such optical links are coupled (e.g., communicatively, electrically, operatively, optically, etc.) to one another via an optical switch fabric (e.g., optical switch 402). For purposes of clarity and brevity, one or more components of polarization-insensitive system 102 are not illustrated in the embodiment depicted in FIG. 4B (e.g., memory 104, processor 106, bus 118, and controller component 202).

In some embodiments, polarization-insensitive system 408A can comprise optical component 108. In some embodiments, optical component 108 can comprise a WDM optical receiver (designated "WDM-RX" in the embodiment depicted in FIG. 4B). In some embodiments, optical component 108 can comprise a polarization-independent component. For example, optical component 108 can comprise a polarization-independent WDM optical receiver (e.g., WDM-RX).

Figure 4C:
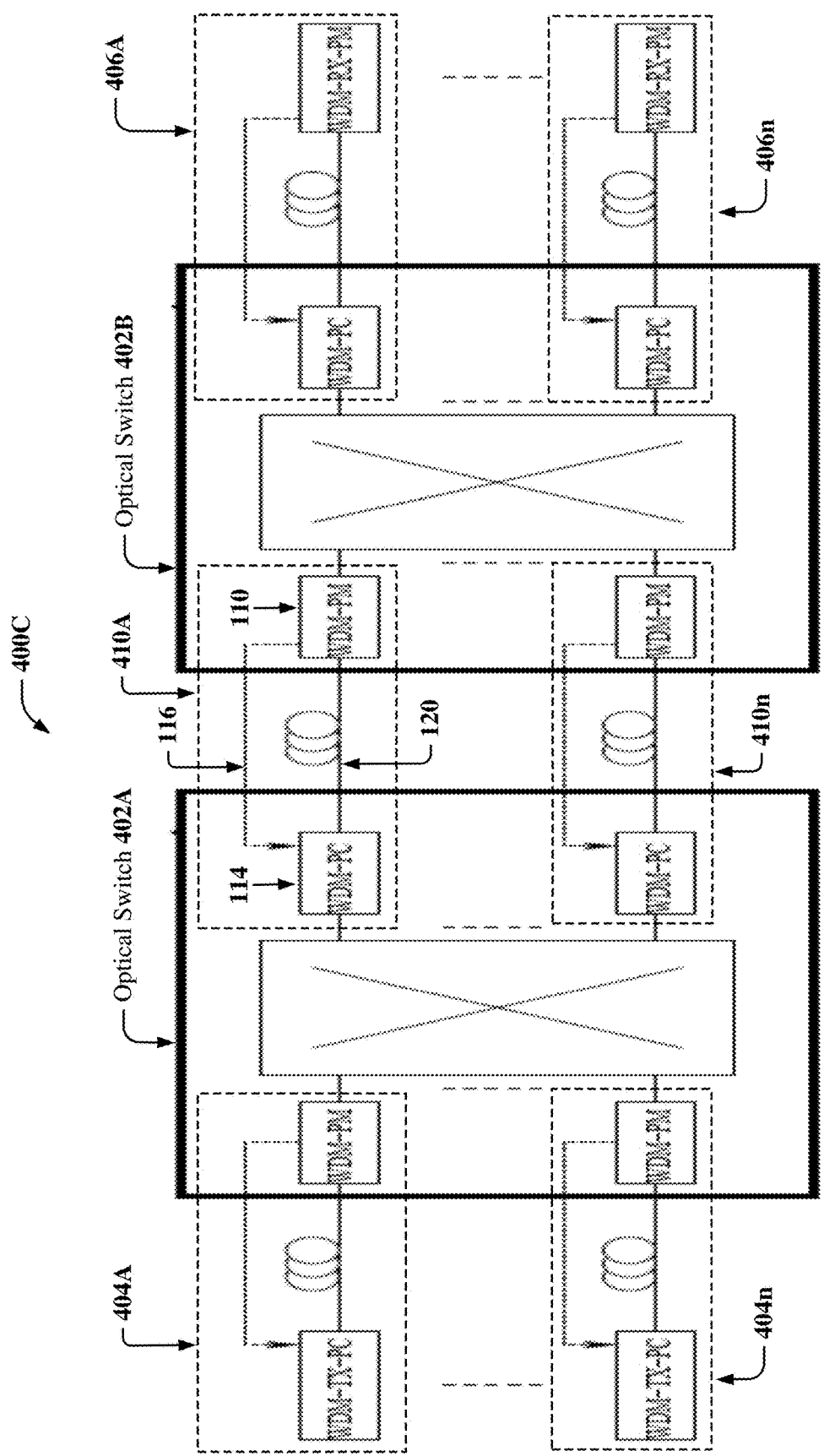
FIG. 4C illustrates a block diagram of an example, non-limiting system that facilitates rotated polarization detection and adjustment components in accordance with one or more embodiments described herein.

FIG. 4C illustrates a block diagram of an example, non-limiting system 400C that facilitates rotated polarization detection and adjustment components in accordance with one or more embodiments described herein. Repetitive description of like elements employed in respective embodiments is omitted for sake of brevity. According to multiple embodiments, system 400C can comprise one or more optical switches 402A, 402B and/or one or more polarization-insensitive systems 410A, 410n, where "n" represents a total quantity of such polarization-insensitive systems.

Although FIG. 4C depicts two (2) optical switches 402A, 402B and two (2) polarization-insensitive systems 410A, 410n, it should be appreciated that the embodiment shown in FIG. 4C is for illustration only, and as such, system 400C is not so limited. Further, although FIG. 4C depicts two (2) optical switches 402A, 402B and two (2) polarization-insensitive systems 410A, 410n, for purposes of clarity, only polarization-insensitive system 410A and associated components are labeled in the embodiment shown in FIG. 4C. Nonetheless, it should be appreciated that, in some embodiments, polarization-insensitive system 410n can comprise the same components and functionality as polarization-insensitive system 410A.

In some embodiments, optical switches 402A, 402B can respectively comprise optical switch 402 described above with reference to FIG. 4A. In some embodiments, optical switches 402A, 402B can integrate multiple polarization-insensitive systems 404A, 404n, polarization-insensitive systems 406A, 406n, and polarization-insensitive systems 410A, 410n, where such polarization-insensitive systems can comprise alternative embodiments of polarization-insensitive system 102 implemented as optical links of an optical switch network. For example, polarization-insensitive systems 404A, 404n, polarization-insensitive systems 406A, 406n, and polarization-insensitive systems 410A, 410n can comprise alternative embodiments of polarization-insensitive system 102 implemented as optical links of a wavelength-division multiplexing (WDM) optical switch network (e.g., a multi-channel or multi-wavelength optical switch network), where such optical links are coupled (e.g., communicatively, electrically, operatively, optically, etc.) to one another via an optical switch fabric (e.g., optical switches 402A, 402B). For purposes of clarity and brevity, one or more components of polarization-insensitive system 102 are not illustrated in the embodiment depicted in FIG. 4C (e.g., memory 104, processor 106, bus 118, and controller component 202).

In some embodiments, polarization-insensitive system 410A can comprise polarization controller component 114, which can comprise a WDM polarization controller (designated "WDM-PC" in the embodiment depicted in FIG. 4C). In such embodiments, polarization controller component 114 (e.g., WDM-PC) can be integrated into optical switch 402A (e.g., by utilizing one or more techniques for fabricating an integrated circuit as described above with reference to FIG. 1). In some embodiments, polarization-insensitive system 410A can further comprise polarization monitor component 110, which can comprise a WDM polarization monitor (designated "WDM-PM" in the embodiment depicted in FIG. 4C). In such embodiments, polarization monitor component 110 (e.g., WDM-PM) can be integrated into optical switch 402B (e.g., by utilizing one or more techniques for fabricating an integrated circuit as described above with reference to FIG. 1).

In some embodiments, polarization-insensitive system 410A can further comprise feedback loop component 116 and/or fiber optic cable 120. In some embodiments, feedback loop component 116 can comprise multiple feedback loops (not illustrated in the embodiment depicted in FIG. 4C), where each loop can correspond to a single wavelength (i.e., channel) of an optical signal transmitted via fiber optic cable 120 (e.g., as described above with reference to FIG. 3B). In some embodiments, polarization-insensitive system 410A can facilitate transmission of feedback signals (e.g., via feedback loop component 116) transmitted by polarization monitor component 110 (e.g., WDM-PM) to polarization controller component 114 (e.g., WDM-PC).

Figure 5A:
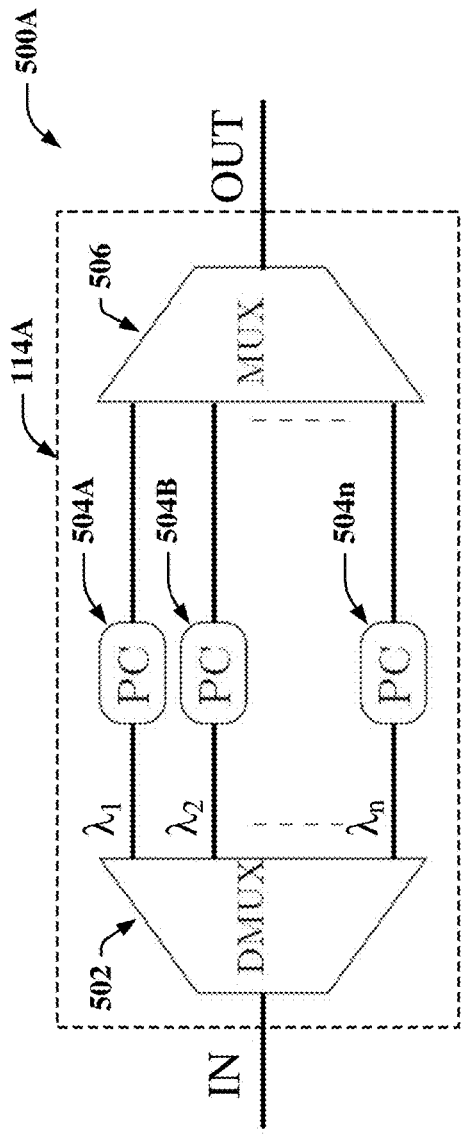
FIG. 5A illustrates a block diagram of an example, non-limiting system that facilitates rotated polarization detection and adjustment components in accordance with one or more embodiments described herein.

FIG. 5A illustrates a block diagram of an example, non-limiting system 500A that facilitates rotated polarization detection and adjustment components in accordance with one or more embodiments described herein. Repetitive description of like elements employed in respective embodiments is omitted for sake of brevity. According to multiple embodiments, system 500A can comprise a wavelength-division multiplexing (WDM) polarization controller 114A. In some embodiments, WDM polarization controller 114A can comprise a wavelength demultiplexer (DMUX) 502, a wavelength multiplexer (MUX) 506, and/or one or more polarization controllers (PC) 504A, 504B, 504n, where "n" represents a total quantity of such polarization controllers.

In some embodiments, polarization controller component 114 (described above with reference to FIG. 1) can comprise one or more WDM polarization controllers 114A that can separately tune respective wavelengths $\lambda_1, \lambda_2, \lambda_n$ (i.e., channels) corresponding to numerous optical carrier signals multiplexed onto a single optical fiber (e.g., optical carrier signals of a WDM optical link network and/or an optically-switched network). For example, WDM polarization controller 114A can comprise a polarization-independent wavelength demultiplexer (DMUX) 502 coupled (e.g., communicatively, electrically, operatively, optically, etc.) to an array of polarization controllers (PC) 504A, 504B, 504n. In this example, such an array of polarization controllers (PC) 504A, 504B, 504n can be coupled (e.g., communicatively, electrically, operatively, optically, etc.) to a polarization-independent wavelength multiplexer (MUX) 506. In some embodiments, polarization controllers (PC) 504A, 504B, 504n can respectively comprise the polarization controller described above with reference to point-to-point optical links, polarization controller component 114, and FIG. 1. For example, polarization controllers (PC) 504A, 504B, 504n can respectively comprise one or more polarization-rotator-splitters (PRS), one or more tunable couplers, and/or one or more phase controllers.

In some embodiments, WDM polarization controller 114A can employ polarization controllers (PC) 504A, 504B, 504n to set a SOP of wavelengths $\lambda_1, \lambda_2, \lambda_n$ respectively. For example, second optical component 112 can comprise WDM polarization controller 114A, which can comprise polarization controllers (PC) 504A, 504B, 504n. In this example, WDM polarization controller 114A can employ polarization controllers (PC) 504A, 504B, 504n to respectively set a SOP of wavelengths $\lambda_1, \lambda_2, \lambda_n$, of an optical signal generated, modulated, and/or transmitted by second optical component 112.

In some embodiments, WDM polarization controller 114A can employ polarization controllers (PC) 504A, 504B, 504n to adjust a rotated SOP of wavelengths $\lambda_1, \lambda_2, \lambda_n$, respectively. For example, based on a feedback signal (e.g., received from polarization monitor component 110) indicative of a rotated polarization of one or more wavelengths $\lambda_1, \lambda_2, \lambda_n$, WDM polarization controller 114A can employ polarization controllers (PC) 504A, 504B, 504n to respectively adjust a rotated SOP of wavelengths $\lambda_1, \lambda_2, \lambda_n$, of an optical signal generated, modulated, and/or transmitted by second optical component 112.

Figure 5B:
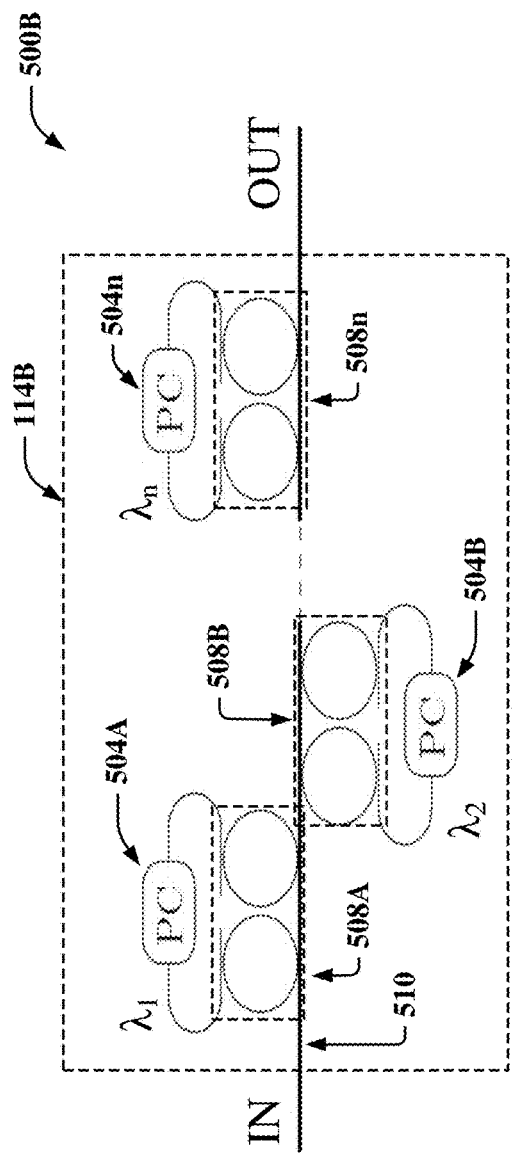
FIG. 5B illustrates a block diagram of an example, non-limiting system that facilitates rotated polarization detection and adjustment components in accordance with one or more embodiments described herein.

FIG. 5B illustrates a block diagram of an example, non-limiting system 500B that facilitates rotated polarization detection and adjustment components in accordance with one or more embodiments described herein. Repetitive description of like elements employed in respective embodiments is omitted for sake of brevity. According to multiple embodiments, system 500B can comprise a wavelength-division multiplexing (WDM) polarization controller 114B. In some embodiments, WDM polarization controller 114B can comprise one or more ring filters 508A, 508B, 508n (where "n" represents a total quantity of such ring filters) that can be cascaded on a bus waveguide 510.

In some embodiments, WDM polarization controller 114B can comprise an alternative embodiment of WDM polarization controller 114A described above with reference to FIG. 5A, where WDM polarization controller 114B can comprise one or more ring filters 508A, 508B, 508n, rather than wavelength demultiplexer (DMUX) 502 and/or wavelength multiplexer (MUX) 506. In some embodiments, to facilitate separately setting and/or adjusting a SOP of wavelengths $\lambda_1, \lambda_2, \lambda_n$, WDM polarization controller 114B can employ ring filters 508A, 508B, 508n (also known as ring resonators) to filter out wavelengths $\lambda_1, \lambda_2, \lambda_n$, respectively. For example, ring filters 508A, 508B, 508n can comprise different radii that can enable such ring filters to respectively filter out a certain wavelength (e.g., $\lambda_1, \lambda_2, \lambda_n$, etc.) of an optical signal. For instance, ring filters 508A, 508B, 508n can be designed such that the respective ring filters are resonant for a certain corresponding wavelength. In some embodiments, ring filters 508A, 508B, 508n can comprise polarization-independent ring filters.

In some embodiments, WDM polarization controller 114B can employ polarization controllers (PC) 504A, 504B, 504n to set a SOP of wavelengths $\lambda_1, \lambda_2, \lambda_n$ respectively. For example, second optical component 112 can comprise WDM polarization controller 114B, which can comprise polarization controllers (PC) 504A, 504B, 504n. In this example, WDM polarization controller 114B can employ polarization controllers (PC) 504A, 504B, 504n to respectively set a SOP of wavelengths $\lambda_1, \lambda_2, \lambda_n$, of an optical signal generated, modulated, and/or transmitted by second optical component 112.

In some embodiments, WDM polarization controller 114B can employ polarization controllers (PC) 504A, 504B, 504n to adjust a rotated SOP of wavelengths $\lambda_1, \lambda_2, \lambda_n$, respectively. For example, based on a feedback signal (e.g., received from polarization monitor component 110) indicative of a rotated polarization of one or more wavelengths $\lambda_1, \lambda_2, \lambda_n$, WDM polarization controller 114B can employ polarization controllers (PC) 504A, 504B, 504n to respectively adjust a rotated SOP of wavelengths $\lambda_1, \lambda_2, \lambda_n$, of an optical signal generated, modulated, and/or transmitted by second optical component 112.

Figure 6:
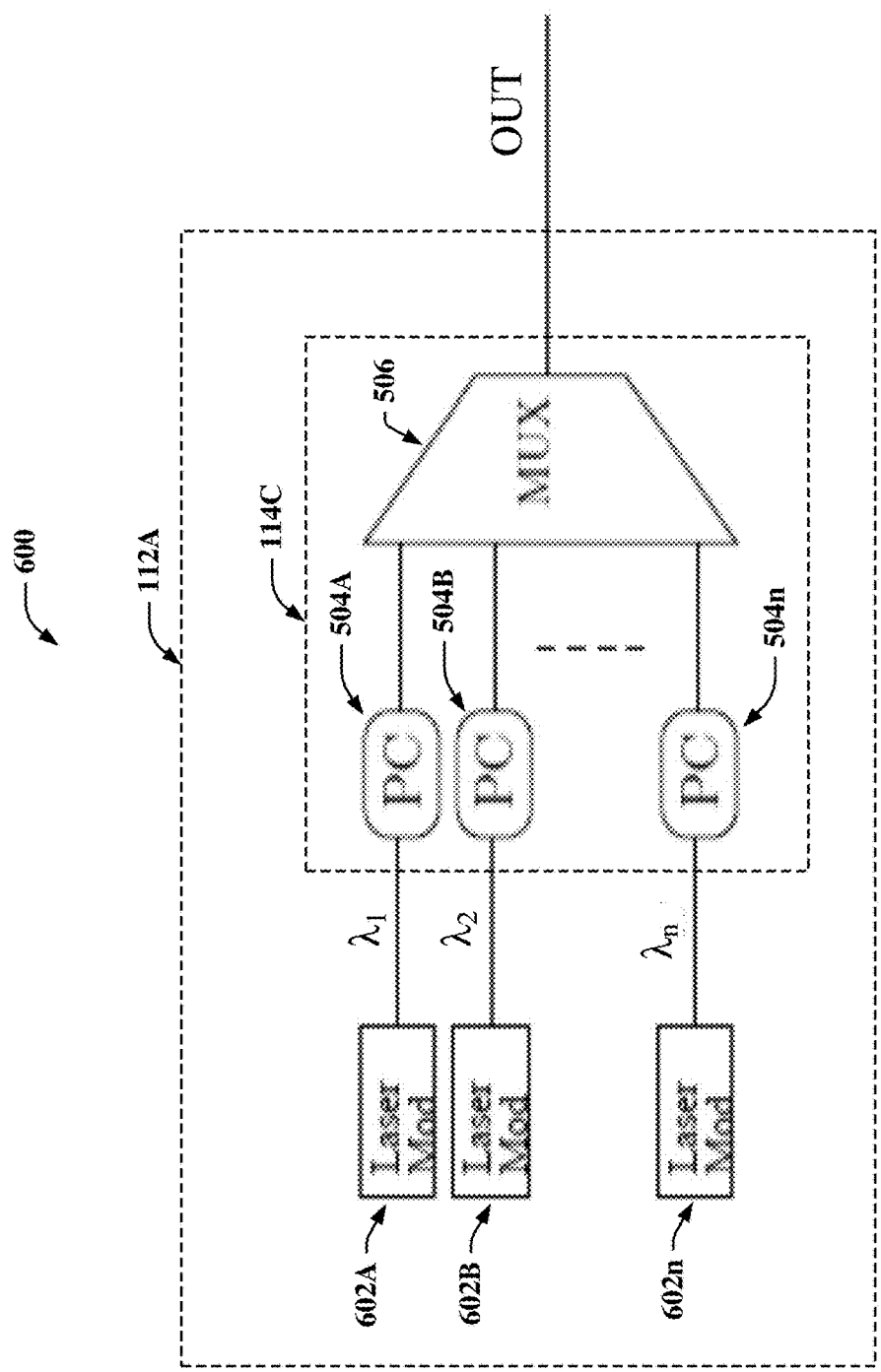
FIG. 6 illustrates a block diagram of an example, non-limiting system that facilitates rotated polarization detection and adjustment components in accordance with one or more embodiments described herein.

FIG. 6 illustrates a block diagram of an example, non-limiting system 600 that facilitates rotated polarization detection and adjustment components in accordance with one or more embodiments described herein. Repetitive description of like elements employed in respective embodiments is omitted for sake of brevity. According to multiple embodiments, system 600 can comprise a wavelength-division multiplexing (WDM) optical transmitter 112A. In some embodiments, WDM optical transmitter 112A can comprise a wavelength-division multiplexing (WDM) polarization controller 114C and/or one or more laser modulators 602A, 602B, 602n, where "n" represents a total quantity of such laser modulators. In the embodiment depicted in FIG. 6, such laser modulators 602A, 602B, 602n are designated as "Laser Mod".

In some embodiments, second optical component 112 (described above with reference to FIG. 1) can comprise WDM optical transmitter 112A. In some embodiments, second optical component 112 can comprise polarization controller component 114 (described above with reference to FIG. 1), which can comprise WDM polarization controller 114C that can separately tune respective wavelengths $\lambda_1, \lambda_2, \lambda_n$ (i.e., channels) corresponding to numerous optical carrier signals multiplexed onto a single optical fiber by wavelength multiplexer (MUX) 506.

In some embodiments, WDM optical transmitter 112A can further comprise one or more laser modulators 602A, 602B, 602n that can generate and/or modulate a beam of light (e.g., a coherent light, as described above with reference to second optical component 112 and FIG. 1). In some embodiments, laser modulators 602A, 602B, 602n can be respectively coupled (e.g., communicatively, electrically, operatively, optically, etc.) to polarization controllers (PC) 504A, 504B, 504n of WDM polarization controller 114C. In some embodiments, polarization controllers (PC) 504A, 504B, 504n can be coupled (e.g., communicatively, electrically, operatively, optically, etc.) to wavelength multiplexer (MUX) 506. In some embodiments, wavelength multiplexer (MUX) 506 can comprise a polarization-independent wavelength multiplexer (MUX). In some embodiments, WDM polarization controller 114C can comprise a WDM optical transmitter comprising n channels, where "n" is the total quantity of channels.

In some embodiments, WDM polarization controller 114C can employ polarization controllers (PC) 504A, 504B, 504n to set a SOP of wavelengths $\lambda_1$, $\lambda_2$, $\lambda_n$, respectively. For example, WDM optical transmitter 112A can employ laser modulators 602A, 602B, 602n to generate and/or modulate a beam of light (e.g., a coherent light) comprising wavelengths $\lambda_1$, $\lambda_2$, $\lambda_n$ and WDM polarization controller 114C can employ polarization controllers (PC) 504A, 504B, 504n to respectively set a SOP of wavelengths $\lambda_1$, $\lambda_2$, $\lambda_n$. In this example, WDM polarization controller 114C can further employ wavelength multiplexer (MUX) 506 to multiplex such wavelengths $\lambda_1$, $\lambda_2$, $\lambda_n$ onto a single optic fiber.

In some embodiments, WDM polarization controller 114C can employ polarization controllers (PC) 504A, 504B, 504n to adjust a rotated SOP of wavelengths $\lambda_1$, $\lambda_2$, $\lambda_n$, respectively. For example, based on a feedback signal (e.g., received from polarization monitor component 110) indicative of a rotated polarization of one or more wavelengths $\lambda_1$, $\lambda_2$, $\lambda_n$, WDM polarization controller 114C can employ polarization controllers (PC) 504A, 504B, 504n to respectively adjust a rotated SOP of wavelengths $\lambda_1$, $\lambda_2$, $\lambda_n$, of an optical signal generated, modulated, and/or transmitted by WDM optical transmitter 112A.

FIG. 7A illustrates a block diagram of an example, non-limiting system 700A that facilitates rotated polarization detection and adjustment components in accordance with one or more embodiments described herein. Repetitive description of like elements employed in respective embodiments is omitted for sake of brevity. According to multiple embodiments, system 700A can comprise a wavelength-division multiplexing (WDM) polarization monitor 110A. In some embodiments, WDM polarization monitor 110A can comprise a broadband polarization beam splitter (PBS) 702, one or more ring filters 704A, 704B, 704n, and/or one or more photodetectors (PD) 706A, 706B, 706n, where "n" represents a total quantity of such ring filters and photodetectors, respectively.

In some embodiments, polarization monitor component 110 (described above with reference to FIG. 1) can comprise a WDM polarization monitor 110A. In some embodiments, to facilitate detecting a rotated polarization state of an optical signal, WDM polarization monitor 110A can comprise one or more broadband polarization beam splitters (PBS) 702 that can separate (split) wanted polarization states (designated "polar 1" in the embodiment illustrated in FIG. 7A) and unwanted polarization states (designated "polar 2" in the embodiment illustrated in FIG. 7A) of one or more wavelengths of an optical signal. For example, polarization beam splitter (PBS) 702 can comprise a broadband polarization beam splitter (PBS) that can separate the polarization state upon which polarization beam splitter (PBS) 702 depends (e.g., polar 1). In some embodiments, polarization beam splitter (PBS) 702 can be implemented using, for example, tunable Mach-Zehnder, directional coupler, multimode interference coupler, photonic crystal, and/or two-dimensional (2-D) out-of-plane grating coupler.

In some embodiments, polarization beam splitter (PBS) 702 can separate a horizontal polarization state (e.g., a wanted transverse electric polarization state, polar 1) from polarization states that are different from the horizontal polarization state, such as, for example, a vertical polarization state (e.g., an unwanted transverse magnetic polarization, polar 2). For example, polarization beam splitter (PBS) 702 can direct the wanted (e.g., horizontal) polarization (polar 1) to downstream components of WDM polarization monitor 110A and/or optical component 108 and the unwanted (e.g., vertical) polarization (polar 2) to ring filters 704A, 704B, 704n and/or photodetectors (PD) 706A, 706B, 706n.

In some embodiments, WDM polarization monitor 110A can employ ring filters 704A, 704B, 704n and/or photodetectors (PD) 706A, 706B, 706n to determine an extent to which a polarization state of a wavelength has been rotated (e.g., by fiber optic cable 120). In some embodiments, ring filters 704A, 704B, 704n can comprise polarization-dependent ring filters or polarization-independent ring filters. In some embodiments, photodetectors (PD) 706A, 706B, 706n can comprise polarization-dependent photodetectors or polarization-independent photodetectors. In some embodiments, ring filters 704A, 704B, 704n can respectively comprise ring filters 508A, 508B, 508n described above with reference to FIG. 5B.

In some embodiments, ring filters 704A, 704B, 704n can filter out one or more certain wavelengths (e.g., as described above with reference to FIG. 5B). For example, ring filters 704A, 704B, 704n can filter out wavelengths $\lambda_1$, $\lambda_2$, $\lambda_n$, respectively. In some embodiments, photodetectors (PD) 706A, 706B, 706n can convert optical energy (e.g., light photons) of wavelengths $\lambda_1$, $\lambda_2$, $\lambda_n$ to an electrical current corresponding to each of such wavelengths $\lambda_1$, $\lambda_2$, $\lambda_n$. For example, photodetectors (PD) 706A, 706B, 706n can convert optical energy of wavelengths $\lambda_1$, $\lambda_2$, $\lambda_n$ to a photo current $I_{pd}$ corresponding to wavelengths $\lambda_1$, $\lambda_2$, $\lambda_n$, respectively. In some embodiments, the photo current $I_{pd}$ corresponding to respective wavelengths $\lambda_1$, $\lambda_2$, $\lambda_n$ can be indicative of a degree of a rotated polarization state of such wavelengths $\lambda_1$, $\lambda_2$, $\lambda_n$. For example, a photo current $I_{pd}$ value that is equal to or greater than a predetermined threshold value can be indicative of a rotated polarization state of a wavelength, and a photo current $I_{pd}$ value that is less than such a threshold value can be indicative of substantially no rotated polarization state of a wavelength. In some embodiments, a photo current $I_{pd}$ value of zero (0) corresponding to a certain wavelength can be indicative of a correct polarization for such wavelength.

According to multiple embodiments, based on detecting a rotated polarization state of an optical signal and/or determining an extent of such rotation (e.g., as described above), WDM polarization monitor 110A can transmit one or more feedback signals to second optical component 112 and/or polarization controller component 114. For example, based on detecting a rotated polarization state of an optical signal generated and transmitted by second optical component 112, WDM polarization monitor 110A can transmit one or more feedback signals to polarization controller component 114 via feedback loop component 116 as described above with reference to FIG. 1.

FIG. 7B illustrates a block diagram of an example, non-limiting system 700B that facilitates rotated polarization detection and adjustment components in accordance with one or more embodiments described herein. Repetitive description of like elements employed in respective embodiments is omitted for sake of brevity. According to multiple embodiments, system 700A can comprise a wavelength-division multiplexing (WDM) polarization monitor 110B. In some embodiments, WDM polarization monitor 110B can comprise a photodetector (PD) 706 and/or a tunable ring filter 708.

In some embodiments, WDM polarization monitor 110B can comprise an alternative embodiment of WDM polarization monitor 110A described above with reference to FIG. 7A. In some embodiments, WDM polarization monitor 110B can employ tunable ring filter 708 and/or photodetector (PD) 706 to determine an extent to which a polarization state of a wavelength has been rotated (e.g., by fiber optic cable 120). In some embodiments, photodetector (PD) 706 can comprise any one of photodetectors (PD) 706A, 706B, 706n described above with reference to FIG. 7A. In some embodiments, tunable ring filter 708 can comprise a polarization-dependent tunable ring filter or a polarization-independent tunable ring filter.

In some embodiments, tunable ring filter 708 can filter out one or more wavelengths $\lambda_1$, $\lambda_2$, $\lambda_n$. For example, WDM polarization monitor 110B can employ tunable ring filter 708 to filter out one or more wavelengths $\lambda_1$, $\lambda_2$, $\lambda_n$. In some embodiments, WDM polarization monitor 110B can employ photodetector (PD) 706 to convert optical energy of wavelengths $\lambda_1$, $\lambda_2$, $\lambda_n$ (e.g., filtered by tunable ring filter 708) to a photo current $I_{pd}$ corresponding to wavelengths $\lambda_1$, $\lambda_2$, $\lambda_n$, respectively (e.g., as described above with reference to photodetectors (PD) 706A, 706B, 706n and FIG. 7A). According to multiple embodiments, based on detecting a rotated polarization state of an optical signal and/or determining an extent of such rotation (e.g., as described above), WDM polarization monitor 110B can transmit one or more feedback signals to second optical component 112 and/or polarization controller component 114 (e.g., via feedback loop component 116 as described above with reference to FIG. 1).

FIG. 7C illustrates a block diagram of an example, non-limiting system 700C that facilitates rotated polarization detection and adjustment components in accordance with one or more embodiments described herein. Repetitive description of like elements employed in respective embodiments is omitted for sake of brevity.

According to multiple embodiments, system 700C can comprise a wavelength-division multiplexing (WDM) polarization monitor 110C. In some embodiments, WDM polarization monitor 110C can comprise an alternative embodiment of WDM polarization monitor 110A described above with reference to FIG. 7A, where WDM polarization monitor 110C can comprise wavelength demultiplexer (DMUX) 502, rather than ring filters 704A, 704B, 704n. For example, WDM polarization monitor 110C can employ wavelength demultiplexer (DMUX) 502, rather than ring filters 704A, 704B, 704n, to separate one or more wavelengths $\lambda_1$, $\lambda_2$, $\lambda_n$ of an optical signal, where optical energy of such wavelengths $\lambda_1$, $\lambda_2$, $\lambda_n$, can be converted to a corresponding photo current $I_{pd}$ by photodetectors (PD) 706A, 706B, 706n (e.g., as described above with reference to FIG. 7A). According to multiple embodiments, based on detecting a rotated polarization state of an optical signal and/or determining an extent of such rotation (e.g., as described above), WDM polarization monitor 110C can transmit one or more feedback signals to second optical component 112 and/or polarization controller component 114 (e.g., via feedback loop component 116 as described above with reference to FIG. 1).

Figure 8:
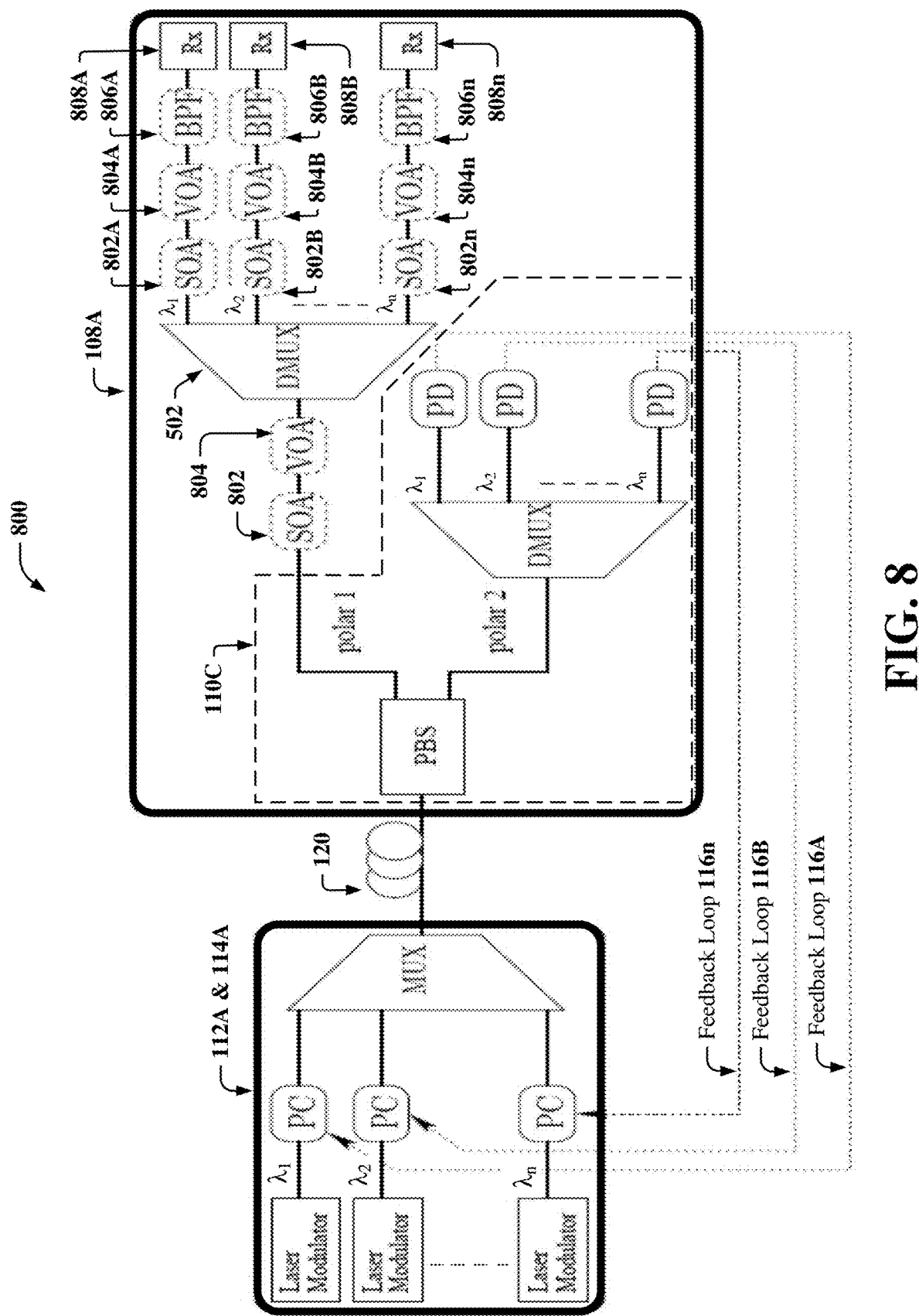
FIG. 8 illustrates a block diagram of an example, non-limiting system that facilitates rotated polarization detection and adjustment components in accordance with one or more embodiments described herein.

FIG. 8 illustrates a block diagram of an example, non-limiting system 800 that facilitates rotated polarization detection and adjustment components in accordance with one or more embodiments described herein. Repetitive description of like elements employed in respective embodiments is omitted for sake of brevity.

According to multiple embodiments, system 800 can comprise WDM optical transmitter 112A and/or a wavelength-division multiplexing (WDM) optical receiver 108A. In some embodiments, WDM optical transmitter 112A can comprise WDM polarization controller 114A. In some embodiments, WDM optical transmitter 112A can be coupled to WDM optical receiver 108A via fiber optic cable 120. In some embodiments, WDM optical transmitter 112A can be coupled to WDM optical receiver 108A via one or more feedback loops 116A, 116B, 116n, where "n" represents a total quantity of such feedback loops. In some embodiments, WDM optical receiver 108A can comprise WDM polarization monitor 110C and/or one or more polarization-dependent components. In some embodiments, such polarization-dependent components can comprise wavelength demultiplexer (DMUX) 502, one or more semiconductor optical amplifiers (SOA) 802, 802A, 802B, 802n, one or more variable optical attenuators (VOA) 804, 804A, 804B, 804n, one or more optical bandpass filters (BPF) 806A, 806B, 806n, and/or one or more optical receivers (Rx) 808A, 808B, 808n, where "n" represents a total quantity of such respective polarization-dependent components.

According to multiple embodiments, optical component 108 (described above with reference to FIG. 1) can comprise WDM optical receiver 108A. In some embodiments, WDM polarization monitor 110C can separate (split) polarizations to detect wanted polarization states (polar 1) and unwanted polarization states (polar 2) of one or more wavelengths of an optical signal (e.g., via polarization beam splitter (PBS) 702, as described above with reference to FIGS. 7A, 7B, & 7C). In some embodiments, WDM optical receiver 108A and/or WDM polarization monitor 110C can direct wanted polarization state "polar 1" (e.g., wanted transverse electric polarization) to one or more polarization-dependent components including, but not limited to, wavelength demultiplexer (DMUX) 502, semiconductor optical amplifiers (SOA) 802, 802A, 802B, 802n, variable optical attenuators (VOA) 804, 804A, 804B, 804n, optical bandpass filters (BPF) 806A, 806B, 806n, optical receivers (Rx) 808A, 808B, 808n, and/or another polarization-dependent components of WDM optical receiver 108A.

In some embodiments, semiconductor optical amplifiers (SOA) 802, 802A, 802B, 802n can comprise optical amplifiers including, but not limited to, semiconductor optical amplifiers (SOA) and/or another optical amplifier. In some embodiments, semiconductor optical amplifiers (SOA) 802, 802A, 802B, 802n can amplify an optical signal (e.g., an optical signal comprising polar 1 polarization state).

In some embodiments, variable optical attenuators (VOA) 804, 804A, 804B, 804n can comprise optical attenuators including, but not limited to, variable optical attenuators (VOA), fixed optical attenuators, step-wise variable optical attenuators, continuously variable optical attenuators, and/or another optical attenuator. In some embodiments, variable optical attenuators (VOA) 804, 804A, 804B, 804n can reduce the power level of an optical signal (e.g., an optical signal comprising polar 1 polarization state).

In some embodiments, optical bandpass filters (BPF) 806A, 806B, 806n can comprise optical bandpass filters, including but not limited to, Lyot filters, Fabry-Perot interferometers, and/or another optical bandpass filter. In some embodiments, optical bandpass filters (BPF) 806A, 806B, 806n can filter a certain wavelength band of an optical signal and block other wavelength bands of such optical signal (e.g., an optical signal comprising polar 1 polarization state).

In some embodiments, optical receivers (Rx) 808A, 808B, 808n can comprise optical receivers that can receive an optical signal comprising one or more wavelengths. For example, optical receivers (Rx) 808A, 808B, 808n can respectively receive wavelengths $\lambda_1$, $\lambda_2$, $\lambda_n$ of an optical signal (e.g., an optical signal comprising polar 1 polarization state).

According to multiple embodiments, based on detecting a rotated polarization state of an optical signal and/or determining an extent of such rotation (e.g., as described above with reference to WDM polarization monitors 110A, 110B, 110C, and FIG. 7A, 7B, 7C, respectively), WDM polarization monitor 110C can transmit one or more feedback signals to WDM optical transmitter 112A and/or WDM polarization controller 114A. For example, WDM polarization monitor 110C can transmit one or more feedback signals to WDM optical transmitter 112A and/or WDM polarization controller 114A via feedback loops 116A, 116B, 116n (e.g., as described above with reference to WDM polarization monitors 110A, 110B, 110C, and FIG. 7A, 7B, 7C, respectively).

Figure 9:
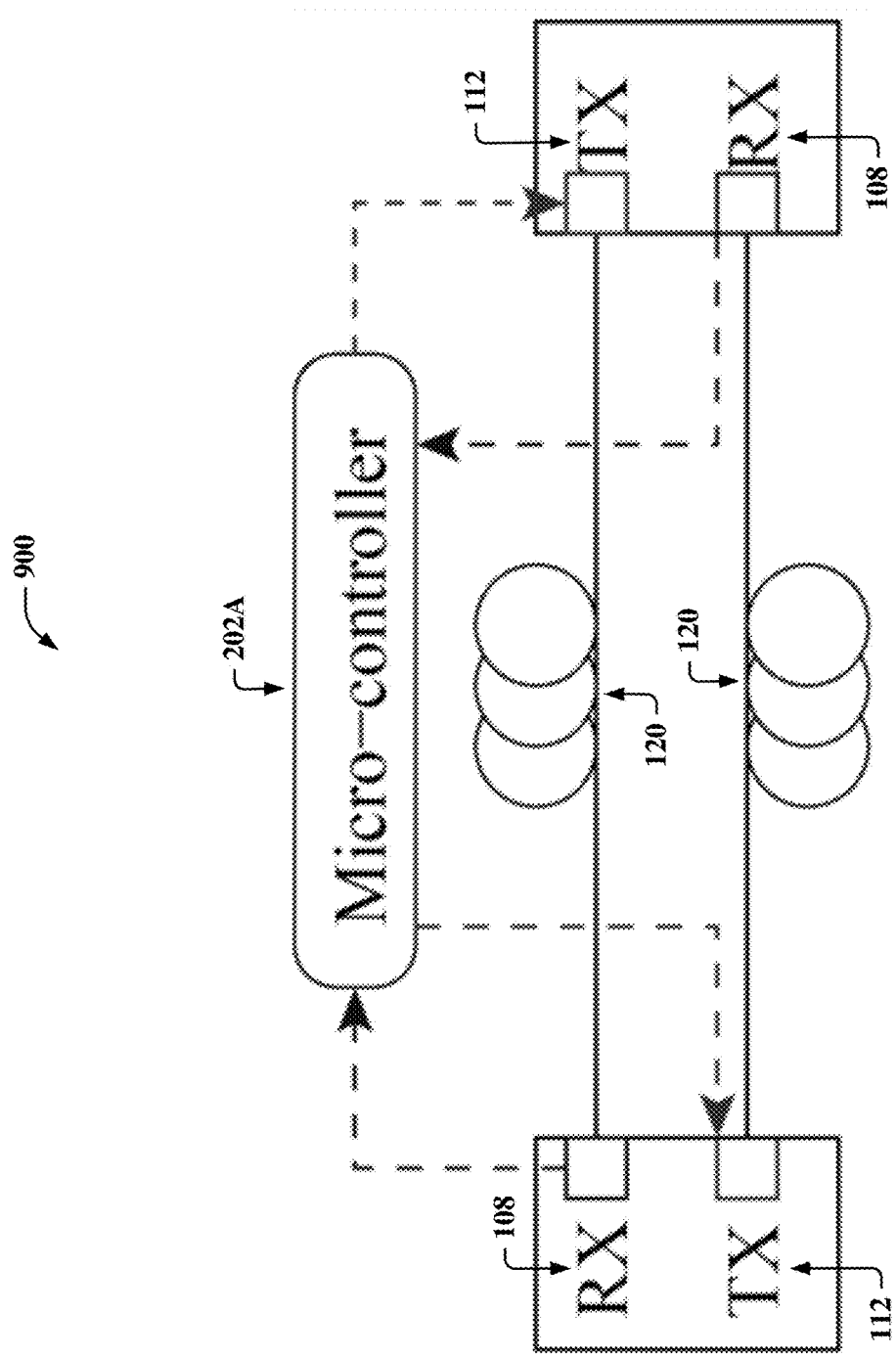
FIG. 9 illustrates a block diagram of an example, non-limiting system that facilitates rotated polarization detection and adjustment components in accordance with one or more embodiments described herein.

FIG. 9 illustrates a block diagram of an example, non-limiting system 900 that facilitates rotated polarization detection and adjustment components in accordance with one or more embodiments described herein. Repetitive description of like elements employed in respective embodiments is omitted for sake of brevity.

According to multiple embodiments, system 900 can comprise an alternative embodiment of system 200, system 300A, system 300B, system 400A, system 400B, system 400C, and/or system 800, where system 900 can comprise micro-controller 202A. In some embodiments, micro-controller 202A can comprise an alternative embodiment of controller component 202 (described above with reference to FIG. 2).

In some embodiments, micro-controller 202A can manage one or more optical feedback signals respectively comprising a photo current $I_{pd}$ value corresponding to one or more respective wavelengths of an optical signal, where such photo current $I_{pd}$ value can be indicative of a degree of a rotated polarization state of such respective wavelengths (e.g., as described above with reference to polarization monitor 110, controller component 202, FIG. 1, and FIG. 2). In some embodiments, micro-controller 202A can manage one or more feedback signals comprising an out-of-band optical signal modulated at kilohertz/megahertz (kHz/MHz) speed. In some embodiments, for example, in a full-duplex link, micro-controller 202A can manage one or more feedback signals respectively comprising information (e.g., a photo current $I_{pd}$ value) encoded in one or more packet headers of a return channel. In some embodiments, for example, in a full-duplex link, micro-controller 202A can manage one or more feedback signals comprising information (e.g., a photo current $I_{pd}$ value) encoded in one or more special sync packets for polarization control (e.g., if permitted by optical link protocol).

Figure 10A:
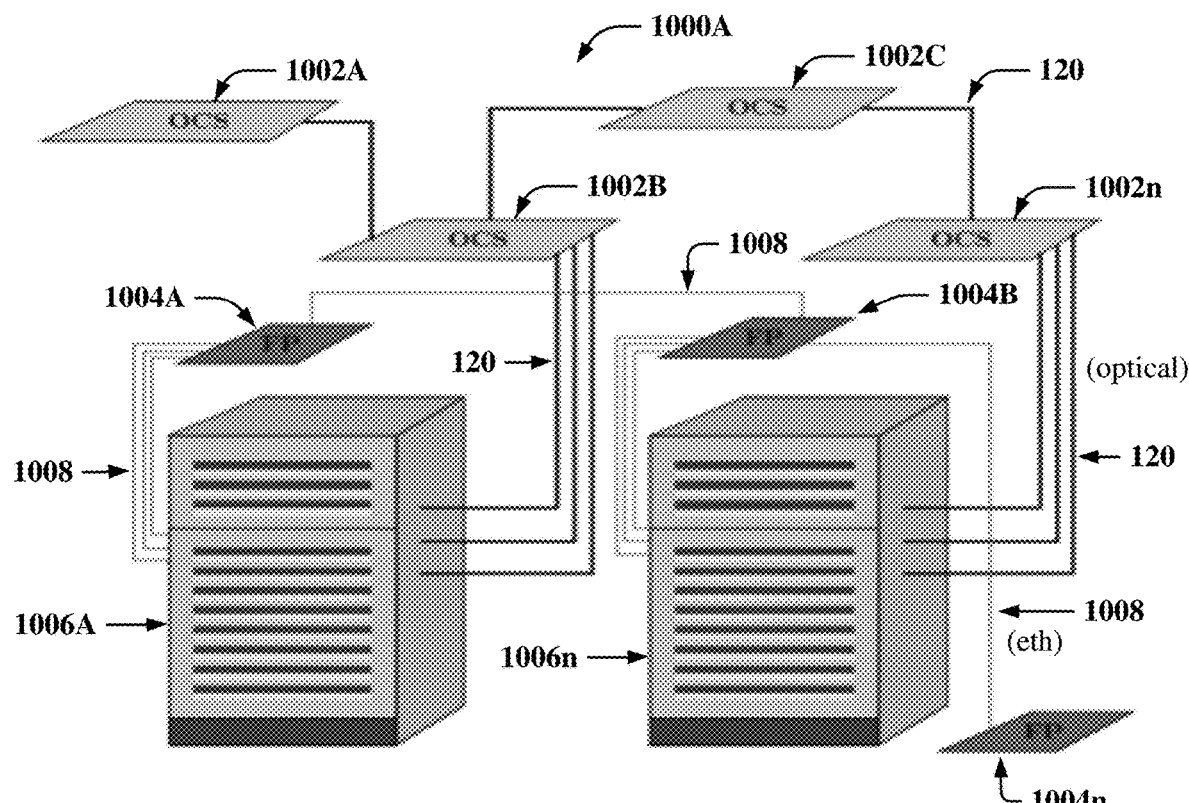
FIG. 10A illustrates a block diagram of an example, non-limiting system that facilitates rotated polarization detection and adjustment components in accordance with one or more embodiments described herein.

FIG. 10A illustrates a block diagram of an example, non-limiting system 1000A that facilitates rotated polarization detection and adjustment components in accordance with one or more embodiments described herein. Repetitive description of like elements employed in respective embodiments is omitted for sake of brevity.

According to multiple embodiments, system 1000A can comprise one or more optical circuit switches (OCS) 1002A, 1002B, 1002C, 1002n, one or more fabric processors (FP) 1004A, 1004B, 1004n, and/or one or more server racks 1006A, 1006n, where "n" represents a total quantity of such respective components. In some embodiments, optical circuit switches (OCS) 1002A, 1002B, 1002C, 1002n can be coupled to one another and/or to one or more server racks 1006A, 1006n via one or more fiber optic cables (optical) 120 (designated "(optical)" in the embodiment depicted in FIG. 10A). In some embodiments, fabric processors (FP) 1004A, 1004B can be coupled to one another and/or to one or more server racks 1006A, 1006n via one or more ethernet cables (eth) 1008 (designated "(eth)" in the embodiment depicted in FIG. 10A).

In some embodiments, system 1000A can comprise an implementation of one or more of the embodiments of the subject disclosure, in a service and/or fabric processor network. For example, system 1000A can comprise an implementation of system 100, system 200, system 300A, system 300B, system 400A, system 400B, system 400C, system 800, and/or another system of the subject disclosure, in a service and/or fabric processor network, such as, for example, a datacenter network, a high-performance computing (HPC) network, and/or another network.

In some embodiments, one or more of optical circuit switches (OCS) 1002A, 1002B, 1002C, 1002n can comprise system 400A, system 400B, and/or system 400C. In some embodiments, one or more of fabric processors (FP) 1004A, 1004B, 1004n can comprise a network manager that can address one or more server racks 1006A, 1006n and/or one or more servers of such server racks using optical circuit switches (OCS) 1002A, 1002B, 1002C, 1002n and/or ethernet cables (eth) 1008. For example, fabric processors (FP) 1004A, 1004B, 1004n can communicate feedback control information (e.g., feedback signals comprising SOP data) between one or more nodes of system 1000A.

Figure 10B:
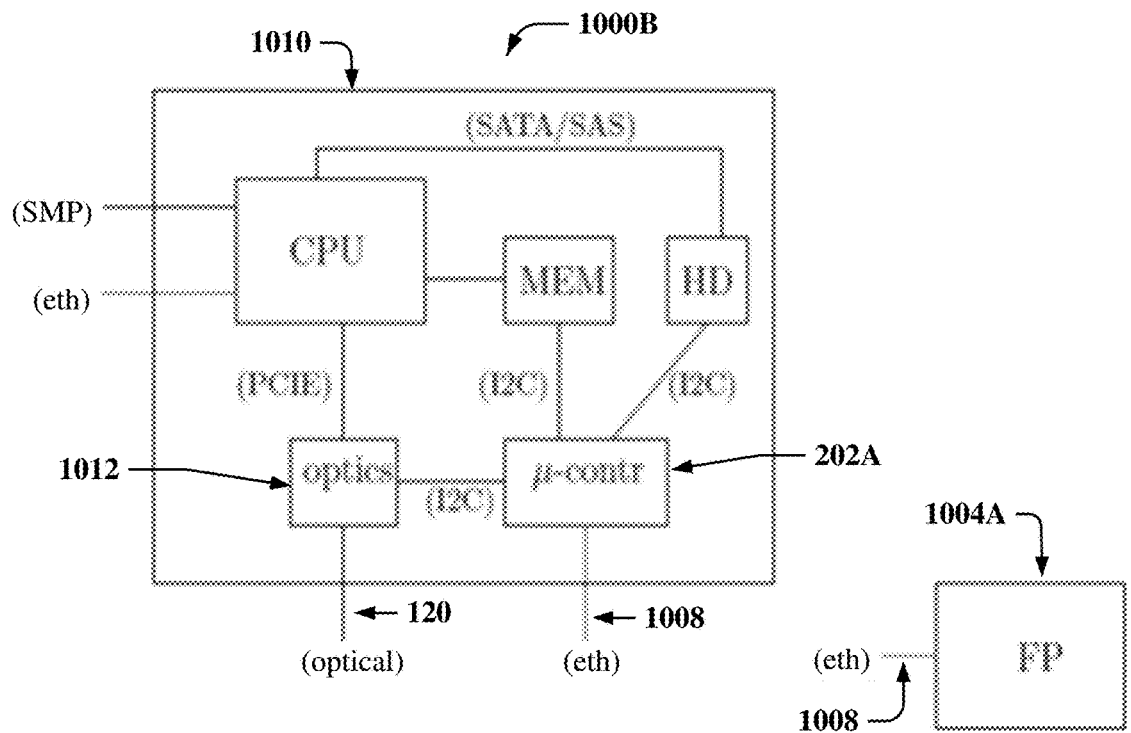
FIG. 10B illustrates a block diagram of an example, non-limiting system that facilitates rotated polarization detection and adjustment components in accordance with one or more embodiments described herein.

FIG. 10B illustrates a block diagram of an example, non-limiting system 1000B that facilitates rotated polarization detection and adjustment components in accordance with one or more embodiments described herein. Repetitive description of like elements employed in respective embodiments is omitted for sake of brevity.

According to multiple embodiments, system 1000B can comprise a server 1010. In some embodiments, server 1010 can be coupled to one or more fabric processors (FP) 1004A, 1004B, 1004n via ethernet cables (eth) 1008. In some embodiments, server 1010 can be coupled to one or more optical circuit switches (OCS) 1002A, 1002B, 1002C, 1002n via fiber optic cables (optical) 120. In some embodiments, server 1010 can be coupled (e.g., communicatively, electrically, operatively, optically, etc.) to a symmetric multiprocessor (SMP) system. In some embodiments, server 1010 can comprise micro-controller (μ-contr) 202A, optics 1012, a central processing unit (CPU), a memory (MEM), a hard drive (HD), a serial AT attachment (SATA), a software as a service (SAS), a bus (I2C), a peripheral component interconnect express (PCIE), a field-programmable gate array (FPGA), and/or a complex programmable logic device (CPLD).

In some embodiments, server 1010 can comprise an implementation of one or more of the embodiments of the subject disclosure, in a service and/or fabric processor network. For example, server 1010 can comprise an implementation of system 100, system 200, and/or another system of the subject disclosure, in a service and/or fabric processor network, such as, for example, a datacenter network, a high-performance computing (HPC) network, and/or another network. In some embodiments, server 1010 can comprise system 100 or system 200 as described above with reference to FIG. 1 and FIG. 2, respectively.

In some embodiments, optics 1012 can comprise optical component 108, polarization monitor component 110, second optical component 112, polarization controller component 114, and/or any alternative embodiments of such respective components described herein. For example, optics 1012 can comprise WDM optical receiver 108A, WDM polarization monitor 110A, WDM polarization monitor 110B, WDM polarization monitor 110C, WDM optical transmitter 112A, WDM polarization controller 114A, WDM polarization controller 114B, WDM polarization controller 114C, and/or another alternative embodiment.

In some embodiments, fabric processor (FP) 1004A can query, and/or send instructions to, any device and/or component of server 1010 (e.g., via ethernet cables (eth) 1008, I2C, SATA/SAS, PCIE, etc.). For example, fabric processor (FP) 1004A can query, and/or send instructions to, micro-controller (μ-contr) 202A, field-programmable gate array (FPGA), complex programmable logic device (CPLD), and/or another component of server 1010. In some embodiments, micro-controller (μ-contr) 202A can query, and/or send instructions to, any device and/or component of optics 1012 (e.g., via I2C). For example, as described above with reference to controller component 202, micro-controller 202A, FIG. 2, and FIG. 9, micro-controller (μ-contr) 202A depicted in the embodiment illustrated in FIG. 10B can query any device and/or component of optics 1012 to request various information corresponding to such devices (e.g., SOP, power levels, etc.). In another example, as described above with reference to controller component 202, micro-controller 202A, FIG. 2, and FIG. 9, micro-controller (μ-contr) 202A depicted in the embodiment illustrated in FIG. 10B can send instructions to any device and/or component of optics 1012 to manage one or more feedback signals, manage adjustment of a rotation polarization state of an optical component, and/or to perform another management operation.

Figure 11:
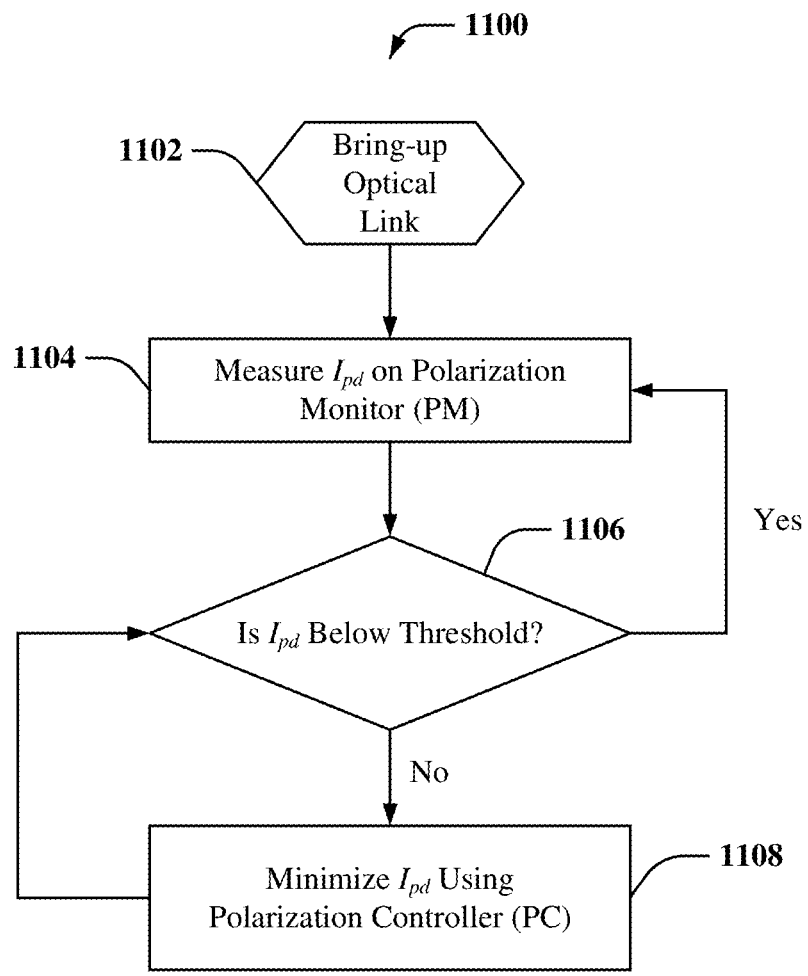
FIG. 11 illustrates a flow diagram of an example, non-limiting computer-implemented method that facilitates rotated polarization detection and adjustment components in accordance with one or more embodiments described herein.

FIG. 11 illustrates a flow diagram of an example, non-limiting computer-implemented method 1100 that facilitates rotated polarization detection and adjustment components in accordance with one or more embodiments described herein. Repetitive description of like elements employed in respective embodiments is omitted for sake of brevity.

At 1102, bring-up optical link. For example, polarization-insensitive system 102 can employ second optical component 112 to transmit (e.g., via fiber optic cable 120) an optical signal comprising one or more wavelengths to optical component 108. In this example, polarization-system 102 can employ controller component 202 and/or micro-controller 202A to query polarization monitor component 110 to request a SOP corresponding to one or more wavelengths of such optical signal.

At 1104, measure $I_{pd}$ on polarization monitor (PM). For example, polarization-insensitive system 102 can employ polarization monitor component 110 to measure a photo current $I_{pd}$ value corresponding to one or more wavelengths of an optical signal received by optical component 108.

At 1106, is $I_{pd}$ below threshold? For example, polarization-insensitive system 102 can employ polarization monitor component 110, controller component 202, and/or micro-controller 202A to compare a predetermined $I_{pd}$ threshold value to a photo current $I_{pd}$ value corresponding to one or more wavelengths of an optical signal received by optical component 108. In some embodiments, an optimized SOP can correspond to a minimum photo current $I_{pd}$ value (e.g., a value less than the predetermined $I_{pd}$ threshold value).

In some embodiments, if a photo current $I_{pd}$ value corresponding to one or more wavelengths of an optical signal is below (less than) the predetermined $I_{pd}$ threshold value, computer-implemented method 1100 returns to operation 1104. In some embodiments, computer-implemented method 1100 repeats operations 1104 and 1106 until such a photo current $I_{pd}$ value corresponding to one or more wavelengths of an optical signal is not below (less than) the predetermined $I_{pd}$ threshold value.

In some embodiments, if a photo current $I_{pd}$ value corresponding to one or more wavelengths of an optical signal is not below (less than) the predetermined $I_{pd}$ threshold value, computer-implemented method 1100 proceeds to operation 1108. At 1108, minimize $I_{pd}$ using polarization controller (PC). For example, polarization-insensitive system 102 can employ polarization controller component 114 to minimize a photo current $I_{pd}$ value. In some embodiments, computer-implemented method 1100 repeats operations 1106 and 1108 until such a photo current $I_{pd}$ value corresponding to one or more wavelengths of an optical signal is below (less than) the predetermined $I_{pd}$ threshold value.

Figure 12:
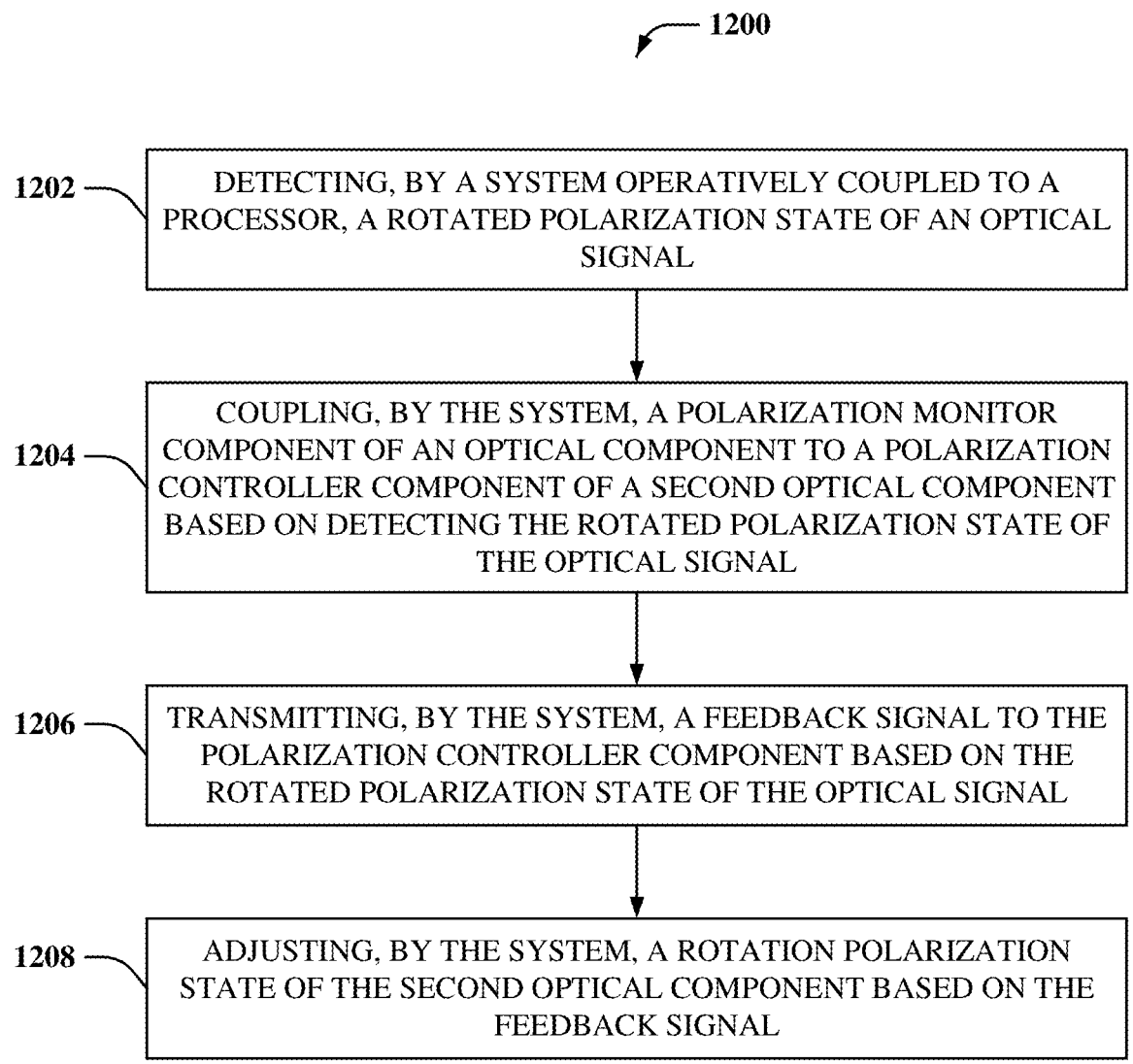
FIG. 12 illustrates a flow diagram of an example, non-limiting computer-implemented method that facilitates rotated polarization detection and adjustment components in accordance with one or more embodiments described herein.

FIG. 12 illustrates a flow diagram of an example, non-limiting computer-implemented method 1200 that facilitates rotated polarization detection and adjustment components in accordance with one or more embodiments described herein. Repetitive description of like elements employed in respective embodiments is omitted for sake of brevity.

At 1202, detecting, by a system (e.g., via polarization-insensitive system 102 and/or polarization monitor component 110) operatively coupled to a processor (e.g., processor 106), a rotated polarization state of an optical signal. At 1204, coupling, by the system (e.g., via polarization-insensitive system 102 and/or feedback loop component 116), a polarization monitor component (e.g., polarization monitor component 110) of an optical component (e.g., optical component 108) to a polarization controller component (e.g., polarization controller component 114) of a second optical component (e.g., second optical component 112) based on detecting the rotated polarization state of the optical signal (e.g., the detecting of operation 1202). At 1206, transmitting, by the system (e.g., via polarization-insensitive system 102, polarization monitor component 110, and/or feedback loop component 116), a feedback signal to the polarization controller component based on the rotated polarization state of the optical signal. At 1208, adjusting, by the system (e.g., via polarization-insensitive system 102 and/or polarization controller component 114), a rotation polarization state of the second optical component based on the feedback signal.

Figure 13:
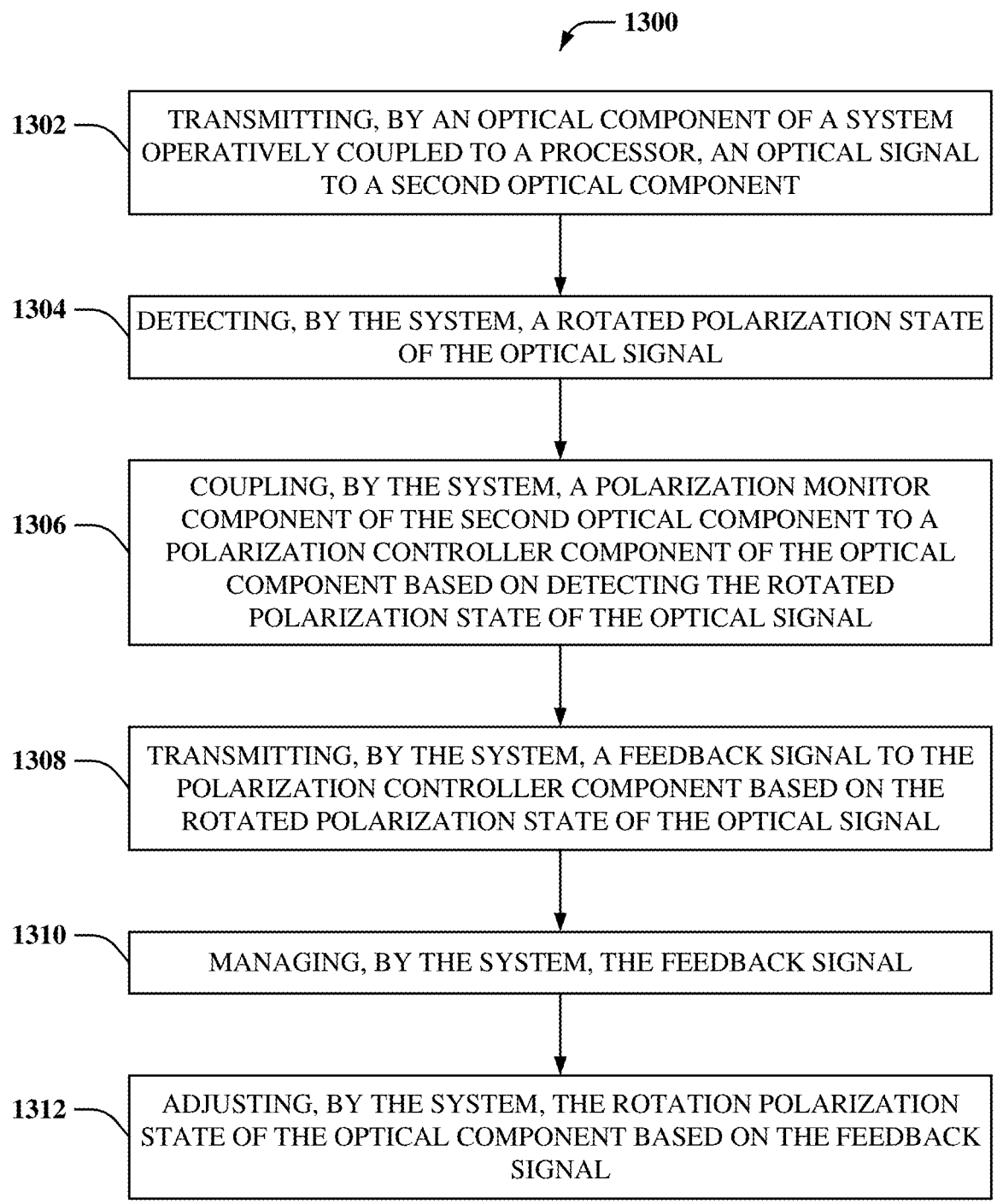
FIG. 13 illustrates a flow diagram of an example, non-limiting computer-implemented method that facilitates rotated polarization detection and adjustment components in accordance with one or more embodiments described herein.

FIG. 13 illustrates a flow diagram of an example, non-limiting computer-implemented method 1300 that facilitates rotated polarization detection and adjustment components in accordance with one or more embodiments described herein. Repetitive description of like elements employed in respective embodiments is omitted for sake of brevity.

At 1302, transmitting, by an optical component of a system (e.g., via second optical component 112 and polarization-insensitive system 102, respectively) operatively coupled to a processor (e.g., processor 106), an optical signal to a second optical component (e.g., optical component 108). At 1304, detecting, by the system (e.g., via polarization-insensitive system 102 and/or polarization monitor component 110), a rotated polarization state of the optical signal. At 1306, coupling, by the system (e.g., via polarization-insensitive system 102 and/or feedback loop component 116), a polarization monitor component (e.g., polarization monitor component 110) of the second optical component (e.g., optical component 108) to a polarization controller component (e.g., polarization controller component 114) of the optical component (e.g., second optical component 112). At 1308, transmitting, by the system (e.g., via polarization-insensitive system 102, polarization monitor component 110, and/or feedback loop component 116), a feedback signal to the polarization controller component based on the rotated polarization state of the optical signal. At 1310, managing, by the system (e.g., via polarization-insensitive system 102 and/or controller component 202), the feedback signal. At 1312, adjusting, by the system (e.g., via polarization-insensitive system 102 and/or polarization controller component 114), the rotation polarization state of the optical component based on the feedback signal.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 14:
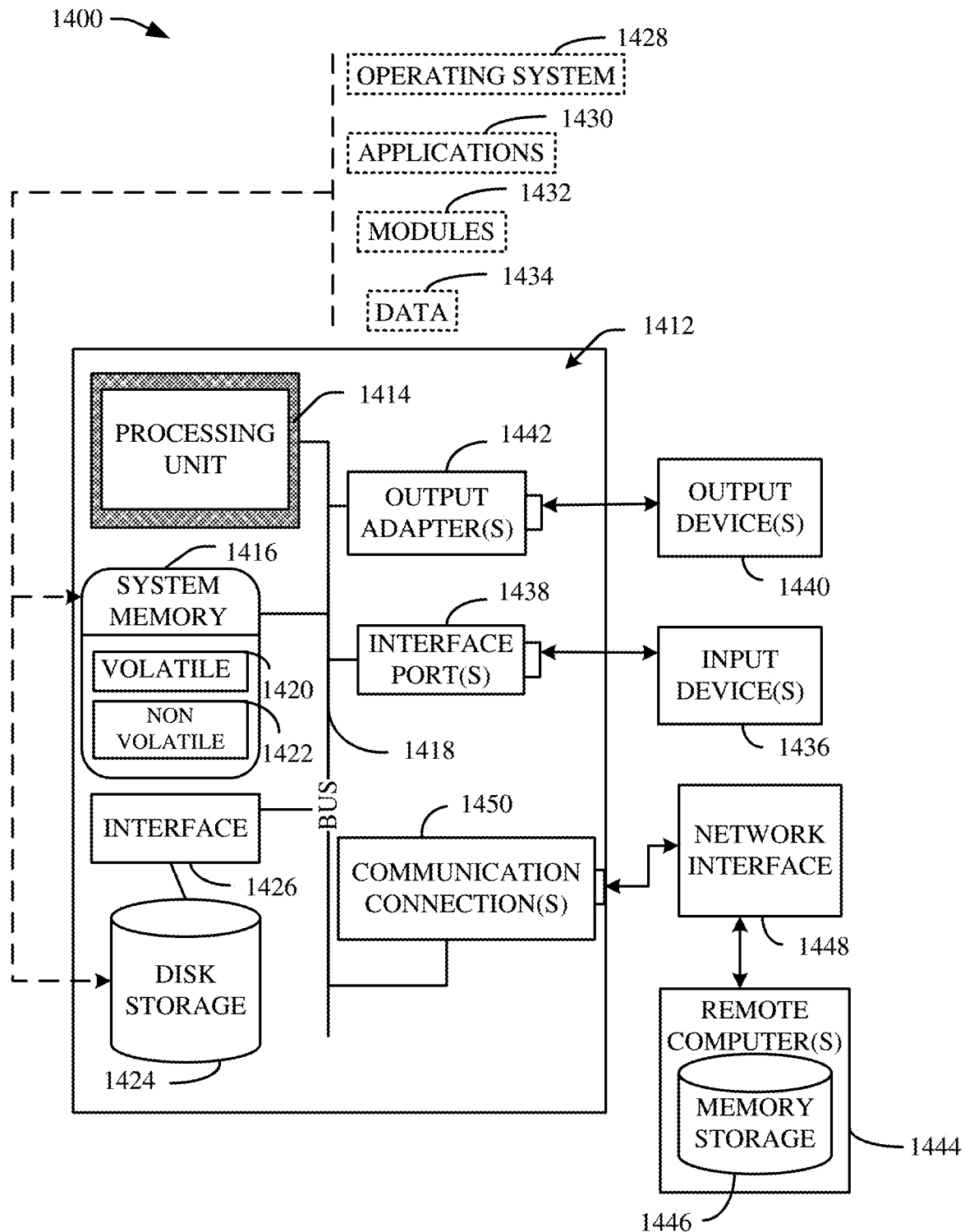
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a block diagram of an example, non-limiting operating environment in which one or more embodiments described herein can be facilitated. Repetitive description of like elements employed in other embodiments described herein is omitted for sake of brevity.

With reference to FIG. 14, a suitable operating environment 1400 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media. To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1400. Such software can also include, for example, an operating system 1428. Operating system 1428, which can be stored on disk storage 1424, acts to control and allocate resources of the computer 1412.

System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor based appliance, a peer device or other common network node and the like, and typically can also include many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR- RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   at least one memory that stores computer executable components; and
   at least one processor that executes the computer executable components stored in the at least one memory, wherein the computer executable components comprise:
   a polarization monitor component that:
      detects an incorrect rotated polarization state of a wavelength of an optical signal received at an optical component from a second optical component, and
      transmits a feedback signal to a polarization controller component, wherein the feedback signal comprises a photo current value representing an amount of rotation of the incorrect rotated polarization state of the wavelength of the optical signal;
   the polarization controller component that:
      accesses a lookup table that comprises settings of a polarization controller of the second optical component for the polarization controller to produce various rotated polarization states of wavelengths of the optical signal, wherein the lookup table was generated during a calibration of the polarization controller, and the settings comprise respective settings of elements selected from a group consisting of a polarization-rotator-splitter and a tunable coupler,
      selects at least one setting from the lookup table to generate a correct rotated polarization state of the wavelength of the optical signal based on the feedback signal, and
      adjusts the polarization controller to employ the at least one setting to modify the incorrect rotated polarization state of the wavelength of the optical signal transmitted from the second optical component into the correct rotated polarization state.

2. The system of claim 1, wherein the polarization controller component adjusts the settings of the polarization controller further based on the selected setting, thereby facilitating improved performance associated with the system.

3. The system of claim 1, further comprising a controller component that manages the feedback signal.

4. The system of claim 1, wherein the optical component is selected from a group consisting of an optical receiver, a wavelength-division multiplexer optical receiver, an optical switch, and an optical repeater.

5. The system of claim 1, wherein the second optical component is selected from a group consisting of an optical transmitter, a wavelength-division multiplexer optical transmitter, an optical switch, and an optical repeater.

6. The system of claim 1, wherein at least one of the optical component or the second optical component comprises one or more polarization-dependent components, thereby facilitating improved power efficiency associated with the processor.

7. The system of claim 1, further comprising an optical fiber that couples the optical component and the second optical component to one another, wherein the second optical component transmits the optical signal to the optical component via the optical fiber.

8. The system of claim 1, wherein the polarization monitor component detects respective rotated polarization states of wavelengths of a wavelength-division multiplexed optical signal.

9. The system of claim 8, wherein the polarization monitor component transmits one or more other feedback signals to the polarization controller component based on the respective rotated polarization states of the wavelengths of the wavelength-division multiplexed optical signal, and wherein the polarization controller component adjusts the settings of the polarization controller to modify the rotated polarization states of the wavelengths of the wavelength-division multiplexed optical signal based on the one or more other feedback signals.

10. The system of claim 1, wherein the lookup table is a first lookup table, and polarization monitor component employs a second lookup table to determine the photo current value as a function of polarization state, wavelength, and time.

11. A computer-implemented method, comprising:
   detecting, by a system operatively coupled to at least one processor, via a polarization monitor component, an incorrect rotated polarization state of a wavelength of an optical signal transmitted by an optical component;
   transmitting, by the system, via the polarization monitor component, a feedback signal to a polarization controller component, wherein the feedback signal comprises a photo current value representing an amount of rotation of the incorrect rotated polarization state of the optical signal;
   accessing, by the system, via the polarization controller component, a lookup table that identifies settings of a polarization controller of the optical component for the polarization controller to produce various rotated polarization states of wavelengths of the optical signal, wherein the lookup table was generated during a calibration of the polarization controller, and the settings comprise respective settings of elements selected from a group consisting of a polarization-rotator-splitter and a tunable coupler;

selecting, by the system, via the polarization controller component, at least one setting from the lookup table to generate a correct rotated polarization state of the wavelength of the optical signal based on the feedback signal; and adjusting, by the system, via the polarization controller component, the polarization controller to employ the at least one setting to modify the incorrect rotated polarization state of the wavelength of the optical signal transmitted from the optical component into a correct polarization state.

12. The computer-implemented method of claim 11, further comprising adjusting, by the system, via the polarization controller component, the settings of the polarization controller based on the selected setting.

13. The computer-implemented method of claim 11, wherein the lookup table is a first lookup table, and the detecting further comprises employing a second lookup table to determine the photo current value as a function of polarization state, wavelength, and time.

14. The computer-implemented method of claim 11, wherein the optical signal is received at a second optical component.

15. The computer-implemented method of claim 14, wherein the second optical component is selected from a group consisting of an optical receiver, a wavelength-division multiplexer optical receiver, an optical switch, and an optical repeater.

16. A computer program product facilitating a rotated polarization detection and adjustment process, the computer program product comprising a non-transitory computer readable storage medium having program instructions embodied therewith, the program instructions executable by at least one processor to cause a system to:

detect, by a polarization monitor component, an incorrect rotated polarization state of a wavelength of an optical signal transmitted by an optical component;

transmit, by the polarization monitor component, a feedback signal to a polarization controller component, wherein the feedback signal comprises a photo current value representing an amount of rotation of the incorrect rotated polarization state of the optical signal, access, by the polarization controller component, a lookup table that identifies settings of a polarization controller of the optical component for the polarization controller to produce various rotated polarization states of wavelengths of the optical signal, wherein the lookup table was generated during a calibration of the polarization controller, and the settings comprise respective settings of elements selected from a group consisting of a polarization-rotator-splitter and a tunable coupler;

select, by the polarization controller component, at least one setting from the lookup table to generate a correct rotated polarization state of the wavelength of the optical signal based on the feedback signal; and adjust, by the polarization controller component, the polarization controller to employ the at least one setting to modify the incorrect rotated polarization state of the wavelength of the optical signal transmitted from the optical component into a correct polarization state based on the lookup table.

17. The computer program product of claim 16, wherein the program instructions are further executable by the processor to cause the processor to adjust, via the polarization controller component, the settings of the polarization controller based on the selected setting.

18. The computer program product of claim 16, wherein the lookup table is a first lookup table, and the program instructions executable by a processor to cause the processor to employ a second lookup table to determine the photo current value as a function of polarization state, wavelength, and time.

19. The computer program product of claim 16, wherein the optical component is selected from a group consisting of an optical transmitter, a wavelength-division multiplexer optical transmitter, an optical switch, and an optical repeater.

20. The computer program product of claim 16, wherein the optical signal is transmitted from the optical component via an optical fiber.

* * * * *